(12) United States Patent
Forrest et al.

(10) Patent No.: US 11,549,433 B2
(45) Date of Patent: Jan. 10, 2023

(54) CONTROL SCHEMES FOR THERMAL MANAGEMENT OF POWER PRODUCTION SYSTEMS AND METHODS

(71) Applicant: 8 Rivers Capital, LLC, Durham, NC (US)

(72) Inventors: Brock Alan Forrest, Durham, NC (US); Xijia Lu, Durham, NC (US); Jeremy Eron Fetvedt, Raleigh, NC (US); Navid Rafati, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 76 days.

(21) Appl. No.: 17/077,666

(22) Filed: Oct. 22, 2020

(65) Prior Publication Data

US 2021/0115849 A1  Apr. 22, 2021

Related U.S. Application Data

(60) Provisional application No. 62/924,525, filed on Oct. 22, 2019.

(51) Int. Cl.
*F02C 3/34* (2006.01)
*B01D 53/58* (2006.01)
(Continued)

(52) U.S. Cl.
CPC ............... *F02C 3/34* (2013.01); *B01D 53/58* (2013.01); *B01D 53/9445* (2013.01); *F02C 6/18* (2013.01); *F05D 2210/12* (2013.01)

(58) Field of Classification Search
CPC ...... F02C 3/34; F02C 1/06; F02C 6/18; F05D 2210/12
See application file for complete search history.

(56) References Cited

U.S. PATENT DOCUMENTS 3,063,247 A * 11/1962 Yendall ................ F25J 3/04303
62/646
2002/0043064 A1 * 4/2002 Griffin ..................... F02C 3/34
60/311

(Continued)

FOREIGN PATENT DOCUMENTS

CN 1898499 1/2007
CN 101201171 6/2008
(Continued)

OTHER PUBLICATIONS

Allam et al., "High Efficiency and Low Cost of Electricity Generation from Fossil Fuels While Eliminating Atmospheric Emissions, Including Carbon Dioxide," GHGT-11, *Energy Procedia* 00, 2012, pp. 1-12.

(Continued)

*Primary Examiner* — Steven M Sutherland
(74) *Attorney, Agent, or Firm* — Womble Bond Dickinson (US) LLP

(57) ABSTRACT

The present invention relates to systems and methods for controlling a power production plant and optionally providing a one or more product streams for an end use thereof. Control of a power production plant specifically can include executing one or more functions effective for adjusting a heat profile of a heat exchange unit (HEU) operating with a plurality of streams passing therethrough. This can include implementing a control function that alters a flow of one or more of the plurality of streams by adding flow to or withdrawing flow one or more of the plurality of streams at an intermediate temperature range within the HEU at a point that is positioned between a first end and a second end of the HEU.

20 Claims, 6 Drawing Sheets

(51) Int. Cl.
  *B01D 53/94* (2006.01)
  *F02C 6/18* (2006.01)

(56) References Cited

U.S. PATENT DOCUMENTS

| | | | |
|---|---|---|---|
| 2012/0036860 A1* | 2/2012 | Wettstein | F02C 3/34 60/39.511 |
| 2012/0067056 A1 | 3/2012 | Palmer et al. | |
| 2012/0073261 A1 | 3/2012 | Palmer et al. | |
| 2012/0237881 A1 | 9/2012 | Allam et al. | |
| 2013/0081395 A1 | 4/2013 | Frey et al. | |
| 2013/0104525 A1 | 5/2013 | Allam et al. | |
| 2013/0118145 A1 | 5/2013 | Palmer et al. | |
| 2013/0199195 A1 | 8/2013 | Allam et al. | |
| 2013/0205746 A1 | 8/2013 | Allam et al. | |
| 2013/0213049 A1 | 8/2013 | Allam et al. | |
| 2013/0229018 A1 | 9/2013 | Karni et al. | |
| 2013/0232989 A1 | 9/2013 | Osorio | |
| 2013/0327050 A1 | 12/2013 | Slobodyanskiy et al. | |
| 2014/0000271 A1 | 1/2014 | Mittricker et al. | |
| 2014/0053529 A1 | 2/2014 | Allam et al. | |
| 2014/0272625 A1* | 9/2014 | Berlowitz | H01M 8/0612 429/411 |
| 2014/0331687 A1 | 11/2014 | Palmer et al. | |
| 2015/0020497 A1 | 1/2015 | Iwai et al. | |
| 2015/0027099 A1 | 1/2015 | Iwai et al. | |
| 2015/0059313 A1 | 3/2015 | Itoh et al. | |
| 2015/0152791 A1 | 6/2015 | White | |
| 2015/0377146 A1 | 12/2015 | Della-Fera et al. | |
| 2016/0363009 A1 | 12/2016 | Fetvedt et al. | |
| 2018/0156127 A1 | 6/2018 | Hausmann et al. | |
| 2018/0179939 A1 | 6/2018 | Beutel et al. | |
| 2018/0259183 A1* | 9/2018 | Fetvedt | F02C 3/22 |
| 2019/0271266 A1 | 9/2019 | Allam | |

FOREIGN PATENT DOCUMENTS

| | | |
|---|---|---|
| CN | 101324203 | 12/2008 |
| CN | 102834670 | 12/2012 |
| CN | 103221640 | 7/2013 |
| EP | 1698829 | 9/2006 |
| JP | 2225905 | 9/1990 |
| JP | 6-26362 | 2/1994 |
| JP | 3110114 | 11/2000 |
| JP | 2000-337107 | 12/2000 |
| JP | 2001-132472 | 5/2001 |
| JP | 3454372 | 10/2003 |
| WO | WO 95/12757 | 5/1995 |
| WO | WO 2009/041617 | 4/2009 |
| WO | WO 2012/003079 | 1/2012 |

OTHER PUBLICATIONS

Combs, Jr. "An Investigation of the Supercritical CO2 Cycle (Feher Cycle) for Shipboard Application," 1971, *Submitted in Partial Fulfillment of the Requirements for the Degree of Ocean Engineer and the Degree of Master of Science in Mechanical Engineering at the Massachusetts Institute of Technology*, 148.

Dostal et al., "A Supercritical Carbon Dioxide Cycle for Next Generation Nuclear Reactors," 2004, (*Research Paper*) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

Mathieu et al., "Sensitivity Analysis of the MATIANT Cycle", *Energy Conversion & Management*, 1999, pp. 1687-1700, vol. 40.

Wall et al., "A Zero Emission Combustion Power Plant for Enhanced Oil Recovery," *Energy*, 1995, pp. 823-828, vol. 20, No. 8.

Yantovskii et al. , "Computer Exergonomics of Power Plants Without Exhaust Gases," Energy Convers. Mgmt., Publ. 1992, vol. 33, No. 5-8, pp. 405-412.

http://www.graz-cycle.mgraz.at/pdfs/Bolland_Kyamsdal_Boden_Liege.pdf; Boland, "A Thermodynamic Comparison of the Oxy-Fuel Power Cycles Water-Cycle, Graz-Cycle and Matiant-Cycle," *Norwegian University of Science and Technology*, Trondheim, Norway.

http://www2.ulg.ac be/genieuc/pageco2.htm; Université de Liège, Department of Power Generation, "CO2 Researches".

* cited by examiner

CONTROL SCHEMES FOR THERMAL MANAGEMENT OF POWER PRODUCTION SYSTEMS AND METHODS

CROSS REFERENCE TO RELATED APPLICATIONS

The present application claims priority to U.S. Patent App. No. 62/924,525, filed Oct. 22, 2019, the disclosure of which is incorporated herein by reference in its entirety.

FIELD OF THE INVENTION

The present disclosure relates to control systems and methods, and more particularly to control systems and methods that can be integrated with power production systems and methods. The control systems and methods can be implemented particularly for management of thermal flows into and out of the power production system.

BACKGROUND OF THE INVENTION

There are many known systems and methods for the combustion of fossil fuels to produce electrical power. Although alternative power production means are constantly being pursued, cost factors and availability of fossil fuels, especially coals and natural gas (as well as waste hydrocarbons, such as residual oil products), drive a continued need for systems configured to combust such fuels. Accordingly, there is a growing need for systems and methods that allow for high efficiency power production with complete carbon capture.

The ability to provide power production from the burning of fossil fuels with complete carbon capture provides the potential for large volume production of carbon dioxide as a valuable commodity. The compound is used, for example, in the metals industry (e.g., to enhance hardness in casting molds), in manufacturing and construction (e.g., as a shield gas in MIG/MAG welding), in chemical manufacturing (e.g., as a raw material in methanol and urea production), in petroleum field management (e.g., for enhanced oil production techniques), and in the food and beverage industries (e.g., for carbonation, for use as a refrigerant, for decaffeinating coffee, for separation and purification of volatile flavor and fragrance concentrates, and for cold sterilization in admixture with ethylene oxide), to name a few. Depending upon the actual use, carbon dioxide input to an industrial use often must be pressurized and/or heated beyond ambient conditions.

Provision of clean $CO_2$ for uses such as noted above (as well as other uses) typically includes separation of the $CO_2$ from an industrial gas mixture, which mixture often contains further compounds, such as CO, $H_2$, sulfur, and the like. This, of course, requires a series of purification processes. The purification requirements as well as the need for providing the $CO_2$ at the desired pressure and/or temperature can entail procuring dedicated compression, cleanup, and heating equipment that leads to high capital costs and large energy consumptions.

In addition to the foregoing, power production processes are typically configured for utilization and production of significant amounts of thermal energy. This thermal energy may be utilized directly in power production or may be available for further uses. Thus, there is a need for means for controlling power production processes such that various product flows, such as carbon dioxide and modes of thermal transfer, may be efficiently obtained and/or exported for a further use.

SUMMARY OF THE INVENTION

In one or more embodiments, the present disclosure can provide systems and methods useful for controlling one or more aspects of a power production system. The control systems particularly can provide control over one or more of pressure, temperature, flow rate, and stream composition of one or more flow streams in a power production system. The control systems can provide for optimum efficiency of the power production system. The control systems further can provide control over aspects of the power production system, such as start-up of the system, shutdown of the system, change of input stream(s) in the system, change of output stream(s) in the system, handling of operating emergencies related to the system, and any like considerations related to operation of a power production system. In some embodiments, the control systems can be particularly adapted to or configured to provide for management of thermal flows into and out of the power production systems and methods. For example, thermal flows may be embodied in a heat transfer fluid and/or by passage of a dedicated stream in the power production system through a heat exchanger against a dedicated stream in a different system.

The present disclosure more particularly can relate to export of $CO_2$ from a power production cycle such that the $CO_2$ can be utilized in a variety of beneficial end uses without the need for compression and/or heating of the $CO_2$ at the actual point of use. U.S. Pat. No. 8,596,075 to Allam et al., the disclosure of which is incorporated herein by reference, describes a high efficiency power production cycle wherein oxy-fuel combustion is carried out utilizing a recycle $CO_2$ stream wherein at least a portion of the $CO_2$ can be captured as a relatively pure stream. Because of the nature of the cycle wherein combustion gases and recycle $CO_2$ can be provided at a variety of pressures and temperatures, such systems and methods can be configured according to the present disclosure to withdrawn substantially pure $CO_2$ across a beneficially wide pressure and/or temperature range for export.

In one or more embodiments, the present disclosure thus provides to systems and methods whereby $CO_2$ arising from a power production cycle utilizing $CO_2$ as a working fluid can be taken as an end product and fed directly into a further downstream use of the material. For example, the systems and methods of the present disclosure can allow for the export of $CO_2$ as a chemical feedstock and/or heat transfer fluid at various temperatures and pressures for use in downstream endothermic industrial processes.

In some embodiments, the presently disclosed systems and methods are beneficial in that low-grade heat can be provided to an external process. This may be accomplished in an example embodiment by using combustion-derived $CO_2$ effectively as a heat carrier. Moreover, the present disclosure provides for management of plant turndown (i.e. turbine stability and operability) through the export of said low-grade heat along with changes to the flow rate through the hot gas compressor ("HGC") of the power production system from which the $CO_2$ is derived. As such, by relying upon the power production cycle utilizing a $CO_2$ working fluid can, it is possible to partially or completely eliminate the need for combustion to be carried out separate from the power production cycle itself. As such, the maximum temperature can be limited by the total heat quality and quantity that can be taken from the recuperative heat exchanger train utilized in the power production cycle before the hot gas compressor can no longer supplement the losses (i.e. maintain heat exchanger profile). In this manner, the systems and methods of the present disclosure can provide distinct advantages over other possible industrial sources of $CO_2$, such as systems wherein $CO_2$ compression heat is recovered in order to help generate steam that is used to strip $CO_2$ from recovery columns. In such less desirable alternatives, the heat recovery process is an add-on independent of direct power generation activities and thus cannot provide many of the advantages of the presently disclosed systems and methods. As such, known systems and methods do not include using combustion derived $CO_2$ taken from a supercritical $CO_2$ power production cycle, and likewise do not contemplate supplying external thermal energy for chemical processes by using $CO_2$ as a transportable heat sink.

In one or more embodiments, the present disclosure can provide a method for providing a $CO_2$ stream for an end use thereof. For example, such method can comprise: combusting a fuel to form a combustion stream comprising $CO_2$; generating power; removing one or more contaminants from the combustion stream to provide a substantially pure stream of $CO_2$; and exporting the substantially pure stream of $CO_2$ at one or both of a temperature and pressure that is greater than ambient. In particular, exported $CO_2$ can be at a pressure of about 2 bar or greater, about 5 bar or greater, about 10 bar or greater, about 25 bar or greater, about 50 bar or greater, or about 100 bar or greater (said export pressure having an upper limit in line with pressure limits inherent to the equipment required to compress the $CO_2$ and the equipment used to transport the $CO_2$). In some embodiment, the pressure can be about 2 bar to about 500 bar, about 10 bar to about 490 bar, about 25 bar to about 480 bar, about 50 bar to about 475 bar, about 75 bar to about 450 bar, or about 100 bar to about 400 bar. Exported $CO_2$ can be at a temperature of about 35° C. or greater, about 40° C. or greater, about 50° C. or greater, about 75° C. or greater, or about 100° C. or greater (said export temperature having an upper limit in line with temperature limits inherent to the equipment required handling of the $CO_2$). In some embodiment, the temperature can be about 35° C. to about 500° C., about 40° C. to about 450° C., about 50° C. to about 400° C., or about 60° C. to about 350° C.

In one or more embodiments, the present disclosure can relate to a control system suitable for use in a power production plant. For example, the power production plant can be a plant burning a fuel in substantially pure oxygen in a combustor at a pressure of about 12 MPa or greater with an additional circulating $CO_2$ stream to produce a combined stream of combustion products and circulating $CO_2$. In some embodiments, the power production can be further characterized by one or more of the following points, which can be combined in any number or order.

The combined stream can be passed through a power producing turbine with a discharge pressure of at least 10 bar. The turbine exhaust can be cooled in an economizer heat exchange to preheat the circulating $CO_2$ stream. The turbine exhaust can be further cooled to near ambient temperature, and condensed water can be removed. The $CO_2$ gas stream can be compressed to be at or near the turbine inlet pressure using a gas compressor followed by a dense $CO_2$ pump to form the circulating $CO_2$ stream. Net $CO_2$ produced in the combustor can be removed at any pressure between the turbine inlet and outlet pressures. Heat from an external source can be introduced to preheat part of the circulating $CO_2$ stream to a temperature in the range 200° C. to 400° C. in order to reduce the temperature difference between the turbine exhaust and the circulating $CO_2$ stream leaving the economizer heat exchanger to about 50° C. or less. The fuel flow rate can be controlled to provide the required power output from the turbine. The turbine outlet temperature can be controlled by the speed of the $CO_2$ pump. The $CO_2$ compressor discharge pressure can be controlled by recycling compressed $CO_2$ flow to the compressor inlet. The flow rate of net $CO_2$ produced from fuel gas combustion and removed from the system can be used to control the $CO_2$ compressor inlet pressure. The difference between the temperature of the turbine exhaust entering the economizer heat exchanger and the temperature of the circulating $CO_2$ stream leaving the economizer heat exchange can be controlled to be at or below 50° C. by controlling the flow rate of a portion of the circulating $CO_2$ stream which is heated by an added heat source. The flow rate of net liquid water and fuel derived impurities removed from the system can be controlled by the level in the liquid water separator. The oxygen flow rate can be controlled to maintain a ratio of oxygen to fuel gas flow rate which can result in a defined excess oxygen in the turbine inlet flow to ensure complete fuel gas combustion and oxidation of components in the fuel gas. The oxygen stream at $CO_2$ compressor inlet pressure can be mixed with a quantity of $CO_2$ from the $CO_2$ compressor inlet to produce an oxidant stream with an oxygen composition of about 15% to about 40% (molar), which can lower the adiabatic flame temperature in the combustor. The oxidant flow required to produce the required oxygen to fuel gas ratio can be controlled by the speed of the oxidant pump. The discharge pressure of the oxidant compressor can be controlled by recycling compressed oxidant flow to the compressor inlet. The inlet pressure of the oxidant compressor can be controlled by the flow rate of diluent $CO_2$ mixed with the oxygen which forms the oxidant stream. The ratio of oxygen to $CO_2$ in the oxidant stream can be controlled by the flow of oxygen. The oxygen can be delivered to the power system at a pressure at least as high as the turbine inlet pressure and where an oxidant stream with an oxygen composition in the range of about 15% to about 40% (molar) can be desired. The oxygen to fuel gas ratio can be controlled by the oxygen flow. The oxygen to $CO_2$ ratio in the oxidant flow can be controlled by the flow of diluent $CO_2$ taken from $CO_2$ compressor discharge.

In one or more embodiments, the present disclosure can provide power production systems that include an integrated control system, which can be configured for automated control of at least one component of the power production system. In particular, the control system can include at least one controller unit configured to receive an input related to a measured parameter of the power production system and configured to provide an output to the at least one component of the power production system subject to the automated control.

The power production system and integrated control system can be further defined in relation to one or more of the following statements, which can be combined in any number and order. The integrated control system can include a power controller configured to receive an input related to power produced by one or more power producing components of the power production system. The power controller can be configured to meet one or both of the following requirements: provide an output to a heater component of the power production system to increase or decrease heat production by the heater component; provide an output to a fuel valve to allow more fuel or less fuel into the power production system. The integrated control system can include a fuel/oxidant ratio controller configured to receive one or both of an input related to fuel flow rate and an input related to oxidant flow rate. The fuel/oxidant ratio controller can be configured to meet one or both of the following requirements: provide an output to a fuel valve to allow more fuel or less fuel into the power production system; provide an output to an oxidant valve to allow more oxidant or less oxidant into the power production system. The integrated control system can include a pump controller configured to receive an input related to temperature of an exhaust stream of a turbine in the power production system and to provide an output to a pump upstream from the turbine to increase or decrease flow rate of a stream exiting the pump. The integrated control system can include a pump suction pressure controller configured to receive an input related to suction pressure on a fluid upstream from a pump in the power production system and to provide an output to a spillback valve that is positioned upstream from the pump. The pump suction pressure controller is configured to meet one or both of the following requirements: cause more of the fluid or less of the fluid to spill back to a point that is further upstream from the spillback valve; cause more of the fluid or less of the fluid to be removed from the power production system upstream from the pump. The integrated control system can include a pressure regulation controller configured to receive an input related to pressure of an exhaust stream of a turbine in the power production system and to provide an output to a fluid outlet valve and allow fluid out of the exhaust stream and optionally to provide an output to a fluid inlet valve and allow fluid into the exhaust stream. The integrated control system can include a water separator controller configured to receive an input related to the amount of water in a separator of the power production system and to provide and output to a water removal valve to allow or disallow removal of water from the separator and maintain the amount of the water in the separator within a defined value. The integrated control system can include an oxidant pump controller configured to receive an input related to one or both of a mass flow of a fuel and a mass flow of an oxidant in the power production system and calculate a mass flow ratio of the fuel and the oxidant. The oxidant pump controller can be configured to provide an output to the oxidant pump to change the power of the pump so as to affect the mass flow ratio of the fuel and the oxidant in the power production system. The integrated control system can include an oxidant pressure controller configured to receive an input related to the pressure of an oxidant stream downstream from an oxidant compressor and to provide an output to an oxidant bypass valve to cause more oxidant or less oxidant to bypass the compressor. The integrated control system can include an oxidant pressure controller configured to receive an input related to the pressure of an oxidant stream upstream from an oxidant compressor and to provide an output to a recycle fluid valve to cause more recycle fluid or less recycle fluid from the power production system to be added to the oxidant stream upstream from the oxidant compressor. In particular, the recycle fluid can be a substantially pure $CO_2$ stream. The integrated control system can include a dilution controller configured to receive an input related to one or both of the mass flow of an oxidant and the mass flow of an oxidant diluent stream and to calculate a mass flow ratio of the oxidant and the oxidant diluent. The dilution controller can be configured to provide an output to an oxidant entry valve to allow more oxidant or less oxidant to enter the power production system so that the mass flow ratio of the oxidant to the oxidant diluent is within a defined range. The integrated control system can include a compressor suction pressure controller configured to receive an input related to suction pressure of a fluid upstream from a compressor in the power production system and to provide an output to a spillback valve that is positioned downstream from the compressor and that causes more of the fluid or less fluid to spill back to a point that is upstream from the compressor. The integrated control system can include a pump speed controller configured to receive an input related to suction pressure upstream from the pump and to provide an output to the pump to increase or decrease pump speed. The integrated control system can include a side flow heat controller configured to receive an input related to a calculated mass flow requirement for a side flow of a high pressure recycle stream in the power production system and to provide an output to a side flow valve to increase or decrease the amount of the high pressure recycle stream in the side flow.

The power production system can comprise: a turbine; a compressor downstream from the turbine and in fluid connection with the turbine; a pump downstream from the compressor and in fluid connection with the compressor; and a heater positioned downstream from the pump and in fluid connection with the pump and positioned upstream from the turbine and in fluid connection with the turbine. Optionally, the power production system can include a recuperator heat exchanger.

In one or more embodiments, the present disclosure can provide methods for automated control of a power production system. In particular, the method can comprise operating a power production system comprising a plurality of components that include: a turbine; a compressor downstream from the turbine and in fluid connection with the turbine; a pump downstream from the compressor and in fluid connection with the compressor; and a heater positioned downstream from the pump and in fluid connection with the pump and positioned upstream from the turbine and in fluid connection with the turbine. Further, operating the power production system can include using one or more controllers integrated with the power production system to receive an input related to a measured parameter of the power production system and provide an output that automatically controls at least one of the plurality of components of the power production system.

In further embodiments, the methods can include one or more of the following steps, which can be combined in any number and order. The output can be based upon a pre-programmed, computerized control algorithm. The operating can include using a controller to receive an input related to power produced by the power production system and direct one or both of the following actions: provide an output to the heater to increase or decrease heat production by the heater; provide an output to a fuel valve of the power production system to allow more fuel or less fuel into the power production system. The operating can include using a controller to receive one or both of an input related to fuel flow rate and an input related to oxidant flow rate and to direct one or both of the following actions: provide an output to a fuel valve of the power production system to allow more fuel or less fuel into the power production system; provide an output to an oxidant valve of the power production system to allow more oxidant or less oxidant into the power production system. The method operating can include using a controller to receive an input related to temperature of an exhaust stream of the turbine and provide an output to the pump upstream from the turbine to increase or decrease flow rate of a stream exiting the pump. The operating can include using a controller to receive an input related to suction pressure on a fluid upstream from the pump and provide an output to a spillback valve that is positioned upstream from the pump. In particular, one or both of the following requirements can be met: the controller causes more of the fluid or less of the fluid to spill back to a point that is further upstream from the spillback valve; the controller causes more of the fluid or less of the fluid to be removed from the power production system upstream from the pump. The operating can include using a controller to receive an input related to pressure of an exhaust stream of the turbine and provide an output to a fluid outlet valve and allow fluid out of the exhaust stream and optionally provide an output to a fluid inlet valve and allow fluid into the exhaust stream. The operating can include using a controller to receive an input related to the amount of water in a separator included in the power production system and provide and output to a water removal valve to allow or disallow removal of water from the separator and maintain the amount of the water in the separator within a defined value. The operating can include using a controller to receive an input related to one or both of a mass flow of a fuel and a mass flow of an oxidant introduced to the power production system and calculate a mass flow ratio of the fuel and the oxidant. In particular, the controller can provide an output to an oxidant pump to change the power of the pump so as to affect the mass flow ratio of the fuel and the oxidant in the power production system. The operating can include using a controller to receive an input related to the pressure of an oxidant stream downstream from an oxidant compressor and provide an output to an oxidant bypass valve to cause more oxidant or less oxidant to bypass the compressor. The operating can include using a controller to receive an input related to the pressure of an oxidant stream upstream from an oxidant compressor and to provide an output to a recycle fluid valve to cause more recycle fluid or less recycle fluid to be added to the oxidant stream upstream from the oxidant compressor. In particular, the recycle fluid can be a substantially pure $CO_2$ stream. The operating can include using a controller to receive an input related to one or both of the mass flow of an oxidant and the mass flow of an oxidant diluent stream and to calculate a mass flow ratio of the oxidant and the oxidant diluent. In particular, the controller can be configured to provide an output to an oxidant entry valve to allow more oxidant or less oxidant to enter the power production system so that the mass flow ratio of the oxidant to the oxidant diluent is within a defined range. The operating can include using a controller to receive an input related to suction pressure of a fluid upstream from the compressor and provide an output to a spillback valve that is positioned downstream from the compressor and that causes more of the fluid or less fluid to spill back to a point that is upstream from the compressor. The operating can include using a controller to receive an input related to suction pressure upstream from the pump and to provide an output to the pump to increase or decrease pump speed. The operating can include using a controller to receive an input related to a calculated mass flow requirement for a side flow of a high pressure recycle stream and provide an output to a side flow valve to increase or decrease the amount of the high pressure recycle stream in the side flow.

In some embodiments, methods for control of a power production plant can comprise: adjusting a heat profile of a heat exchange unit (HEU) operating with a plurality of streams passing between a first HEU end having a first operational temperature and a second HEU end having a second, lower operational temperature; wherein said adjusting comprises implementing a control function that alters a mass flow of one or more of the plurality of streams passing between the first HEU end and the second HEU end by adding mass flow to or withdrawing mass flow from the one or more of the plurality of streams at an intermediate temperature range within the HEU at a point that is positioned between the first HEU end and the second HEU end. Such methods may be further defined in relation to one or more of the following statements, which can be combined in any number and order.

The adjusting can comprise causing a portion of a heated stream passing through the HEU to bypass a section of the HEU through a bypass line such that said adjusting is effective to reduce the mass flow of the heated stream that passes through the section of the HEU that is bypassed.

The heated stream passing through the HEU can be a heated turbine exhaust stream from a turbine, the heated turbine exhaust stream passing from the first HEU end to the second HEU end to provide a cooled turbine exhaust stream, and wherein the cooled turbine exhaust stream can be further processed through one or more of a separator, a compressor, and a pump.

The control function can comprise causing the portion of the heated stream passing through the HEU to bypass the section of the HEU through the bypass line responsive to one or both of the following signals received by a controller: a signal indicating a change in power demand effective to cause an operational change of the turbine altering power generation from the power production plant; and a signal indicating that a temperature within the HEU is within a defined threshold of a maximum operating temperature of the HEU.

The control function can comprise opening a valve positioned in the bypass line.

The portion of the heated stream passing through the bypass line can be rejoined with the cooled turbine exhaust stream downstream from the second HEU end and upstream from one or more of the separator, the compressor, and the pump.

The method further can comprise causing the portion of the heated stream passing through bypass line to be processed through a bypass heat exchanger effective to transfer heat from the portion of the heated stream in the bypass line to one or more further streams.

The adjusting can comprise one or both of the following: causing a portion of a recycle stream being heated in the HEU to be passed to an exhaust stream being cooled in the HEU such that said adjusting is effective to increase the mass flow of the exhaust stream passing through a section of the HEU; and causing a portion of an oxidant stream being heated in the HEU to be passed to an exhaust stream being cooled in the HEU such that said adjusting is effective to increase the mass flow of the exhaust stream passing through a section of the HEU.

The control function can comprise causing the respective portion of the recycle stream and the oxidant stream to be passed to the exhaust stream responsive to one or both of the following: a signal indicating a change in power demand effective to cause an operational change of a turbine altering power generation from the power production plant; a signal indicating that a temperature within the HEU is within a defined threshold of a maximum operating temperature of the HEU.

The power production plant can include a recirculation compressor configured for withdrawing a portion of a heated turbine exhaust stream passing through the HEU, compressing the portion of the heated turbine exhaust stream that is withdrawn, and recombining the portion of the heater turbine exhaust stream that is compressed at a downstream section of the HEU.

The control function can comprise closing an inlet guide vane (IGV) of the recirculation compressor responsive to a signal indicating that a temperature within the HEU is within a defined threshold of a maximum operating temperature of the HEU.

The method further can comprise adding heat to one or more of the plurality of streams passing between the first HEU end and the second HEU end, wherein the heat is added at an intermediate temperature range within the HEU at a point that is positioned between the first HEU end and the second HEU end, and wherein the heat is added using a heater that is operated independent of the HEU.

The heater can be a combustion heater.

The heat can be added to a turbine exhaust stream passing through the HEU, and wherein an exhaust stream from the combustion heater is added directly to the turbine exhaust stream.

In further embodiments, the present disclosure may particularly relate to power production plants. For example, a power production plant can comprise: a turbine; a power generator; a heat exchange unit (HEU); one or more compressors or pumps; and a control unit; wherein the HEU is configured for heat exchange between a plurality of streams passing between a first HEU end having a first operational temperature and a second HEU end having a second, lower operational temperature; wherein the HEU includes one or more components configured to add mass flow to or withdraw mass flow from one or more of the plurality of streams at a point that is positioned between the first HEU end and the second HEU end such that a portion of a fluid passing through the one or more of the plurality of streams is diverted from passage through a remaining section of the HEU; and wherein the control unit is configured to receive a signal defining an operating condition of the power production plant and, based thereon, output a signal effective to control the one or more components configured to add mass flow to or withdraw mass flow from the one or more of the plurality of streams. Such power plants may be further defined in relation to one or more of the following statements, which can be combined in any number and order.

The HEU can be configured for heat exchange between at least a turbine exhaust stream exiting a turbine and one or both of a recycle stream and an oxidant stream.

The one or more components configured to add mass flow to or withdraw mass flow from one or more of the plurality of streams can include a bypass line and a bypass valve configured to divert a portion of the turbine exhaust stream around a section of the HEU.

The power production plant further can comprise a bypass heat exchanger operational with the bypass line and configured to transfer heat from the portion of the turbine exhaust stream diverted therethrough to one or more further streams.

The one or more components configured to add mass flow to or withdraw mass flow from one or more of the plurality of streams can include a recirculation line and a recirculation valve interposed between the turbine exhaust stream and the recycle stream.

The one or more components configured to add mass flow to or withdraw mass flow from one or more of the plurality of streams can include a recirculation line and a recirculation valve interposed between the turbine exhaust stream and the oxidant stream.

The power production plant further can comprise a heater that is configured for operation independent of the HEU, the heater being configured for addition of heat to the turbine exhaust stream at a point that is positioned between the first HEU end and the second HEU end.

The heater can be a combustion heater.

In further embodiments, the present disclosure can provide systems for cogeneration of power and one or more end products. Such systems can comprise: a power production unit including at least a combustor, a turbine, a heat exchanger, and a separation unit, the power production unit being configured to receive a fuel stream and an oxidant and output power and substantially pure carbon dioxide; a syngas production unit configured to receive a feedstock and provide a syngas product, at least a portion of which is effective for use as at least a portion of the fuel stream in the power production unit; an air separation unit configured to provide oxygen for use as the oxidant in the power production unit and configured to provide nitrogen; and one or both of an ammonia synthesis unit and a urea synthesis unit. In further embodiments, such systems may be defined in relation to one or more of the following statements, which can be combined in any number and order.

The ammonia synthesis unit can be present and can be configured to receive nitrogen from the air separation unit, configured to receive hydrogen from a hydrogen source, and configured to output ammonia.

The hydrogen source can be a hydrogen separation unit configured to receive at least a portion of the syngas product from the syngas production unit and provide a stream of hydrogen and a stream of hydrogen-reduced syngas that is effective for use as at least a portion of the fuel stream in the power production unit.

The urea synthesis unit can be present and can be configured to receive nitrogen from a nitrogen source, configured to receive carbon dioxide from the power production cycle, and configured to output a urea stream.

The nitrogen source can be the ammonia synthesis unit.

DETAILED DESCRIPTION

Figure 1:
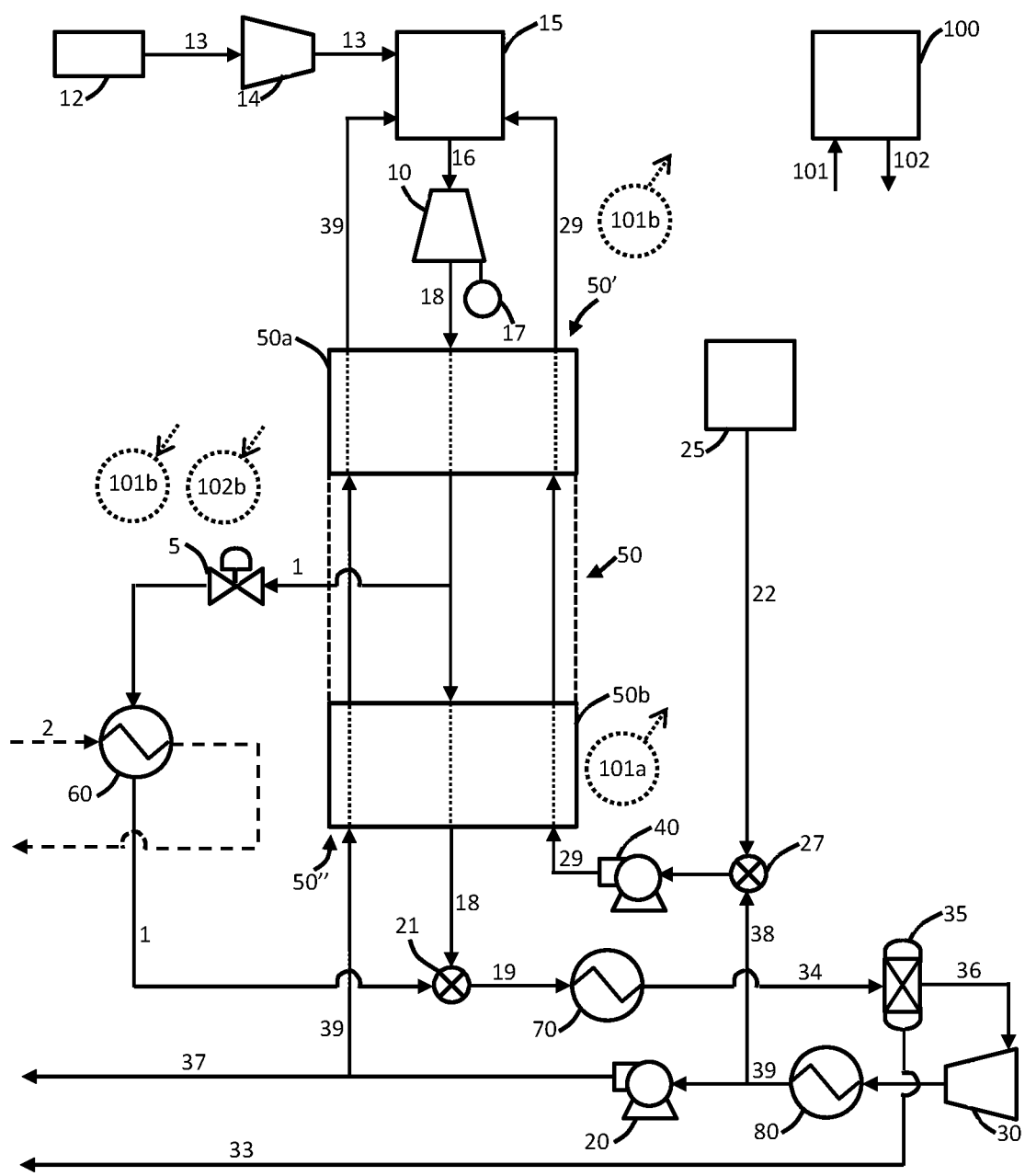
FIG. 1 is a diagram of a power production system and method according to an example embodiment of the present disclosure.

Various aspects of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used in the specification, and in the appended claims, the singular forms "a", "an", "the", include plural referents unless the context clearly dictates otherwise.

In one or more embodiments, the present disclosure provides systems and methods for control of power production. The control systems and methods can be utilized in relation to a wide variety of power production systems. For example, the control systems and methods may be utilized in power production system and methods utilizing a turbine for expansion of a pressurized fluid, particularly wherein turbine outlet temperature is held substantially constant or within a narrowly defined temperature range (e.g., 20° C., 15° C., 10° C., or 5° C.). In some embodiments, the present systems and methods may be defined in that the mechanism that controls turbine inlet pressure may be substantially decoupled from the turbine itself. In example embodiments, this can be in the form of a compressor or pump downstream of a primary pressurization machine that can either be shafted to the turbine or not. In other example embodiments, the turbine may be connected to a generator and a single independently driven pressurization device can work in consort with the working fluid. In such embodiments, the control point between the compressor and pump may be substantially eliminated as described herein.

Examples of power production systems and methods wherein a control system as described herein can be implemented are disclosed in U.S. Pat. Nos. 9,068,743 to Palmer et al., 9,062,608 to Allam et al., 8,986,002 to Palmer et al., 8,959,887 to Allam et al., 8,869,889 to Palmer et al., 8,776,532 to Allam et al., and 8,596,075 to Allam et al, the disclosures of which are incorporated herein by reference. As a non-limiting example, a power production system with which a control system as presently described may be utilized can be configured for combusting a fuel with $O_2$ in the presence of a $CO_2$ circulating fluid in a combustor, preferably wherein the $CO_2$ is introduced at a pressure of at least about 12 MPa and a temperature of at least about 400° C., to provide a combustion product stream comprising $CO_2$, preferably wherein the combustion product stream has a temperature of at least about 800° C. Such power production system further can be characterized by one or more of the following, which may be combined in any number and/or order:

the combustion product stream can be expanded across a turbine with a discharge pressure of about 1 MPa or greater to generate power and provide a turbine discharge steam comprising $CO_2$;

the turbine discharge stream can be passed through a heat exchanger unit to provide a cooled discharge stream;

the cooled turbine discharge stream can be processed to remove one or more secondary components other than $CO_2$ to provide a purified discharge stream;

the purified discharge stream can be compressed to provide a supercritical $CO_2$ circulating fluid stream;

the supercritical $CO_2$ circulating fluid stream can be cooled to provide a high density $CO_2$ circulating fluid (preferably wherein the density is at least about 200 kg/m$^3$);

the high density $CO_2$ circulating fluid can be pumped to a pressure suitable for input to the combustor;

the pressurized $CO_2$ circulating fluid can be heated by passing through the heat exchanger unit using heat recuperated from the turbine discharge stream;

all or a portion of the pressurized $CO_2$ circulating fluid can be further heated with heat that is not withdrawn from the turbine discharge stream (preferably wherein the further heating is provided one or more of prior to, during, or after passing through the heat exchanger); and/or the heated pressurized $CO_2$ circulating fluid can be recycled into the combustor (preferably wherein the temperature of the heated, pressurized $CO_2$ circulating fluid entering the combustor is less than the temperature of the turbine discharge stream by no more than about 50° C.).

The presently disclosed control systems can be particularly useful in relation to power production methods such as exemplified above because of the need for providing precise control over multiple parameters in relation to multiple streams, such parameters needing precise control to provide desired performance and safety. For example, in one or more embodiments, the present control systems can be useful in relation to any one or more of the functions otherwise described herein. In some embodiments, a control system and method as described herein in particular may include any one or more elements and/or features as described in U.S. Pat. No. 10,103,737 to Fetvedt et al., the disclosure of which is incorporated herein by reference.

In one or more embodiments, the presently disclosed systems and methods can relate to heat profile regulation such as in relation to the systems illustrated in FIG. 1 through FIG. 5. Such systems generally can include at least one control unit 100 configured to receive one or more control inputs 101 effective to signal to the control unit 100 to execute one or more control functions implemented via one or more control outputs 102. Control inputs 101 may relate to a measurable property, such as temperature, pressure, flow rate, power output, and the like, and the presently described systems may include one or more sensors or other measurement components configured to provide the desired output. The control outputs 102 may be effective to cause a change in operation of the system, such as opening or closing one or more valves, changing a compression pressure or pump speed to modify a flow rate of one or more streams, or similar operational variables. To this end, useful control systems can be adapted to or configured to control power output and/or turbine exhaust temperature in various power cycle configurations. While maintaining a substantially constant turbine outlet temperature at heat exchanger 50 can reduce stress related to thermal cycling, it does not completely eliminate it. The present disclosure thus can provide additional control functions to address such shortcomings. For example, as power demand at turbine 10 is reduced, a corresponding reduction in output pressure and mass flow can occur at pump 20. This can lead to a change in the heat exchanger thermal profile.

In example embodiments, the present disclosure can provide one or more control functions effective to maintain system efficiency regardless of fluctuating power demand on the system and, alternatively or additionally, to prevent the temperature within one or more sections of the heat exchange unit from exceeding a defined threshold temperature (which can be related to a maximum operating temperature). For instance, a primary recuperative heat exchanger that has been designed and optimized for conditions compatible with full power output at the turbine can increasingly over-perform as power demand decreases. This is because the heat exchanger surface area will have been specified for relatively larger mass flow rates at the turbine exhaust and high pressure working fluid (such as supercritical carbon dioxide) recycle streams. This likewise may apply to oxidant flow as well. The reduction in pressure at the high-pressure working fluid recycle side can also lead to a lower specific heat of the recycle fluid (oxidant flow too if included). These changes may cumulatively manifest as increasing average heat exchanger temperature. To at least partially address such concerns, in some embodiments, the heat exchanger 50 may be configured as a plurality of heat exchangers in series, and the interface temperatures between the units can rise as power demand at the turbine decreases. Such swings in temperature can create thermal stress, but more importantly, they may also lead to failure modes.

In some embodiments it can be desirable to construct heat exchanger 50 to be as cost-effective as possible. Such an approach can lead to the use of differing materials throughout the range of temperatures in the heat exchanger 50. While all materials preferably are rated to the maximum outlet pressure of pump 20 at full turbine power output (minimal losses for best performance), it will be necessary to design the materials to different temperatures as a means of promoting lowest cost solutions (cheapest materials and lowest cumulative masses). Accordingly, it can be preferable for the plant controls to include one or more functions effective for influencing the intermediate temperatures of heat exchanger 50 in order to prevent design limit excursions given changes in heat exchanger average temperature that may occur. This may be achieved in a variety of manners as discussed herein. More particularly, the control functions may be effective to prevent one or more sections of a heat exchange unit (HEU) from exceeding a maximum operating temperature. As such, one or more controls may be implement to output a signal indicating that a temperature within the HEU (or within one or more specific sections of an HEU) is within a defined threshold of a maximum operating temperature. Such threshold may be, for example less than 20% below, less than 10% below, or less than 5% below the maximum operating temperature as defined by the manufacturer. Specifically, the threshold for outputting a high temperature signal may be a range that is within 20% to 1%, within 15% to 1%, within 10% to 1%, within 20% to 2%, within 15% to 2%, within 15% to 5%, within 10% to 2%, or within 10% to 5% of the maximum operating temperature.

The present disclosure therefore can relate to methods for control of a power production plant. In particular, FIGS. 1-5 illustrate schematic flow diagrams of a power production plant according to various embodiments, and the present methods may be implemented to incorporate any combination of elements and/or functions described in relation to said figures and/or expressly illustrated in said figures. In some embodiments, a control method may comprise adjusting a heat profile of a heat exchange unit (HEU) 50 operating with a plurality of streams passing between a first HEU end 50' having a first operational temperature and a second HEU end 50" having a second, lower operational temperature. More particularly, the step of adjusting may include implementing a control function that alters a mass flow or volume flow of one or more of the plurality of streams passing between the first HEU end 50' and the second HEU end 50" by adding fluid (e.g., mass flow or volume flow) to or withdrawing fluid from (e.g., mass flow or volume flow) the one or more of the plurality of streams. This addition or withdrawal of fluid to the one or more streams may be carried out at an intermediate temperature range within the HEU. This means that the addition or withdrawal specifically can be carried out at a point that is positioned between the first HEU end 50' and the second HEU end 50". In other words, this can occur upstream from the second HEU end and downstream from the first HEU end. This can be, for example, at approximately a midpoint of the HEU 50 or at a point that is within 5-45%, 10-40%, or 20-35% of the distance from the first HEU end or at a point that is within 5-45%, 10-40%, or 20-35% of the distance from the first HEU end. Thus, the addition or withdrawal of fluid may take place at a section of the HEU that is nearer the first end (i.e., the "hot" end) or at a section of the HEU that is nearer the second end (i.e., the "cold" end). Any of these positions may be referenced herein as an "intermediate" position in the HEU. In some embodiments, the HEU may be a single integrated unit. In other embodiments, the HEU may be combination of a plurality of HEU sections that are fluidly connected. Thus, an intermediate position in the HEU may be a position between two discrete HEU sections.

In one or more embodiments, as illustrated in FIG. 1, one or more turbine exhaust bypass lines may be utilized for protection of the heat exchanger 50. Generally, in FIG. 1, fuel passes in line 13 from a fuel source 12, optionally being compressed in a fuel compressor 14, to be combusted in combustor 15. Oxidant pass through line 22 from oxidant source 25, which may, for example, and air separation unit, oxygen membrane, or other oxidant source. The oxidant may be passed directly to the combustor 15 but, as illustrated, the oxidant can be mixed with recycled $CO_2$ in mixer/union 27 before being compressed in pump 40 and passed in line 29 through the heat exchanger 50 on route to the combustor 15. In the combustor, the fuel is combusted with the oxidant in the presence of recycled $CO_2$ to form an exhaust stream in line 16 that is then expanded in turbine 10 to generate power (e.g., electricity) in a generator 17. Turbine exhaust then leaves the turbine 10 in line 18.

To effect bypass as noted previously, the turbine exhaust stream in line 18 is passed through the heat exchanger 50, and a portion of the turbine exhaust stream exits the heat exchanger 50 in line 1 at an intermediate temperature. As illustrated in FIG. 1, the heat exchanger 50 is shown as two separate heat exchange sections 50a and 50b; however, the dashed lines illustrate that the separate heat exchange sections may be connected as a single HEU operating with a plurality of sections (e.g., 2 or more, 3 or more, or even more portions) at different conditions. Valve 5 can be opened by the controller as needed so that a portion of flow of the turbine exhaust stream may leave the HEU to later rejoin the main turbine exhaust flow at a point upstream of heat exchanger 70 and/or upstream from the separator 35, and/or upstream from the compressor 30, and/or upstream from the pump 20. Thus, the heat profile of the HEU can be effectively adjusted by causing a portion of the turbine exhaust stream (i.e., a heated stream) to bypass a section of the HEU through a bypass line. Removing a portion of the turbine exhaust gas from line 18 at an intermediate point from heat exchanger 50 has the net effect of reducing the total thermal energy transferred below the temperature in the heat exchanger at which the turbine exhaust stream in line 1 is taken. This results in a reduced average temperature for the remaining portion of the heat exchanger (e.g., available heat in heat exchange section 50b) at the expense of increasing the rejected duty at heat exchanger 70.

If desired, the heat in the turbine exhaust stream removed through bypass line 1 may also be used to heat fluids other than the recycled $CO_2$ that is provided through line 39 and the oxidant that is provided through line 29 to heat exchanger 50. To this end, bypass heat exchanger 60 can use the bypass stream in line 1 as a heat source to provide thermal energy to any process outside of the illustrated power cycle. It should be noted that bypass heat exchanger 60 may simply be a dedicated section of the heat exchanger network 50 (e.g., bypass heat exchanger 60 may be integral to heat exchanger 50 and operated so that only the stream in line 1 passes therethrough for heat removal).

The control function implemented in this fashion thus can cause a portion of a heated stream passing through the HEU to bypass a section of the HEU through the bypass line 1 response to one or more signals received by the controller 100. For example, the input signal received by the controller 100 can be a signal indicating that a temperature within the HEU is within a defined threshold of a maximum operating temperature of the HEU. For example, a temperature output 101 can be generated from one or more temperature sensors at one or more check points within the HEU. Temperature check points within heat exchanger 50 can be configured to provide feedback to a controller operating valve 5. As such, the controller 100 may output a signal 102a to the valve 4 or to a further component of the power production plant to case more or less fluid to pass through the bypass line 1 as appropriate for the given conditions. As intermediate temperatures within heat exchanger 50 approach maximum design limits, the controller providing control over valve 5 will send a signal to valve 5 to open. This will encourage the flow of the stream in line 1 through the bypass heat exchanger 60 before passing on to heat exchanger 70. If operating conditions (e.g., power demand) are such that the intermediate temperatures in heat exchanger 50 are below design limits, then valve 5 may remain closed (or be closed if previously opened) in order to bias the flow through the remainder of heat exchanger 50 (e.g., heat exchange section 50b). This has the benefit of improving the thermal recovery of the power cycle. Any number of bypasses may be integrated in parallel into heat exchanger 50 as a means of providing more finite temperature control at various parts of the exchanger train. The controller for valve 5 and/or any other temperature control valves may in fact operate in such a manner that the power cycle is operated sub-optimally whereby heat recovery within the power cycle is minimized. This scenario may occur when the use of carbon free thermal energy is of greater use at heat exchanger 60 than for the production of power at turbine 10.

In further embodiments, control of the bypass line 1 may be effected based upon power output from the turbine 10 and the generator 17. For example, a signal 101b indicating a change in power demand effective to cause an operational change of the turbine 10 altering power generation from the generator 17 of the power production plant can be received by the controller 100. In response, the controller 100 can provide an output 102b that causes more or less fluid to pass through line 1.

The power production cycle otherwise may continue in that the turbine exhaust in line 18 can merge with the bypass stream in line 1, such as in a mixer/union 21, prior to passage in line 19 to heat exchanger 70, wherein the exhaust stream is cooled to near ambient temperature. The exhaust stream then passes through 34 to separator 35 wherein a substantially pure stream of $CO_2$ is provided in line 36. The stream of $CO_2$ is then compressed in compressor 30, optionally cooled in heat exchanger 80, then pumped in pump 20 to the desired pressure range to be recycled back to the combustor 15 through line 39. Optionally, a portion of the $CO_2$ stream in line 39 can be branched in line 38 and passed to the mixer/union 27, as referenced above, for admixture with the oxidant. Likewise, a portion of the $CO_2$ in line 39 may be separated and passed through line 37 for export or other end use, such as EOR. Water from separator 35 can be passed out of the system through drain line 33.

Figure 2:
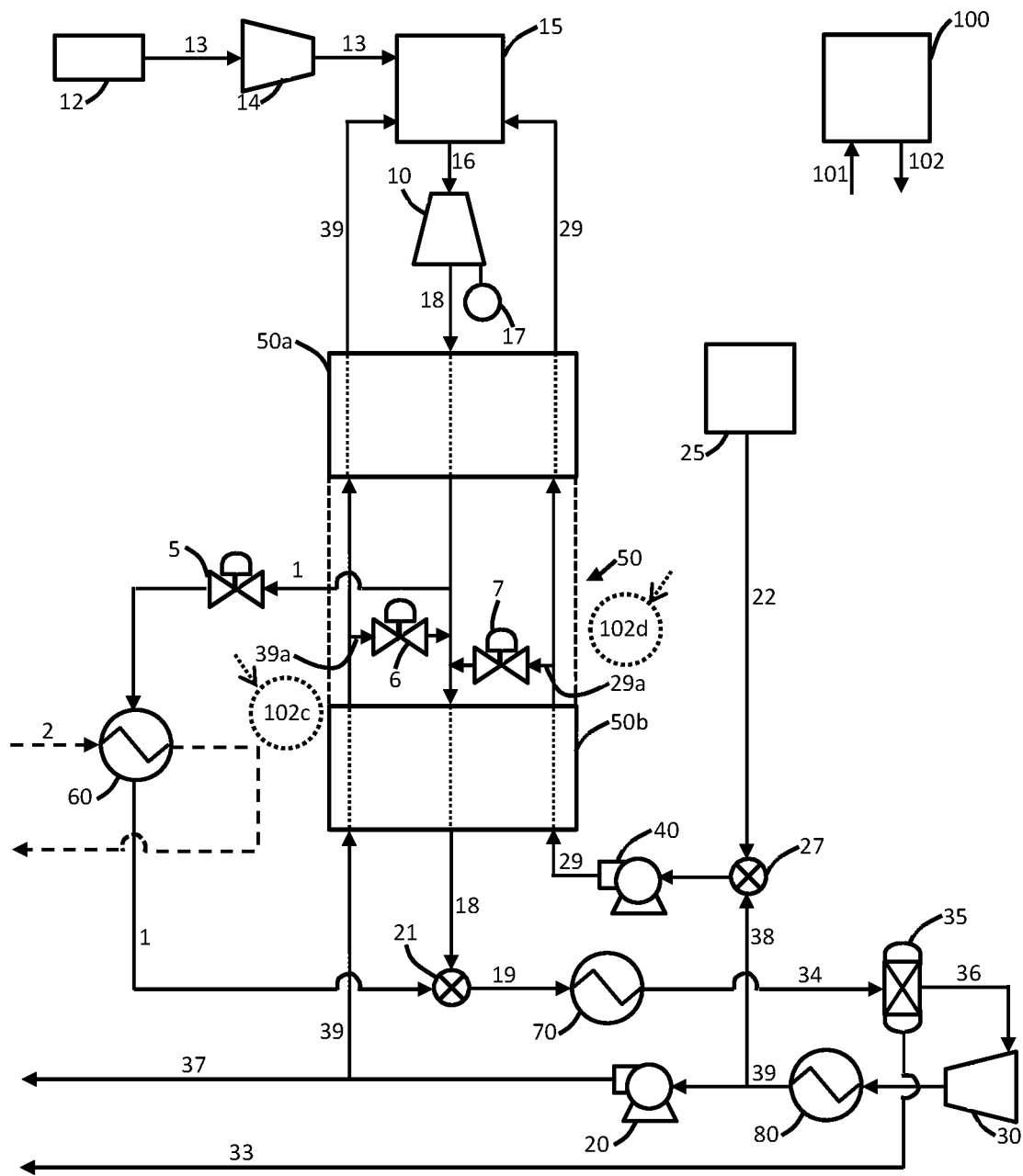
FIG. 2 is a diagram of a power production system and method according to another example embodiment of the present disclosure.

An additional means of heat exchanger temperature control may also incorporate one or more control functions in addition to the above mentioned bypass scheme. FIG. 2 thus illustrates a further example embodiment, wherein elements already described in relation to FIG. 1 are substantially unchanged. In FIG. 2, the power production system can be configured to provide for recirculation of at least a portion of one or both of the flows passing through the heat exchanger 50 from pump 20 and pump 40. For example, valve 6 can be utilized for recirculation of at least a portion of recycle $CO_2$ stream passing through the heat exchanger 50 in line 39 so that said portion of the recycle $CO_2$ stream is passed to the turbine exhaust stream in line 18. Likewise, valve 7 can be utilized for recirculation of at least a portion of the oxidant stream passing through the heat exchanger 50 in line 29 so that said portion of the oxidant stream is passed to the turbine exhaust stream in line 18.

Adjusting a heat profile of the HEU thus can include one or both of the following: causing a portion of a recycle stream being heated in the HEU to be passed to an exhaust stream being cooled in the HEU such that said adjusting is effective to increase the mass flow of the exhaust stream passing through a section of the HEU; and causing a portion of an oxidant stream being heated in the HEU to be passed to an exhaust stream being cooled in the HEU such that said adjusting is effective to increase the mass flow of the exhaust stream passing through a section of the HEU. More particularly, as the desired output of turbine 10 is increased, the discharge flow rates of pump 20 and/or pump 40 to the combustor 15 can be controlled to likewise increase as needed. Should the pumps be operating as fixed speed units, the appropriate valve in the respective recirculation line (e.g., valve 6 in line 39a or valve 7 in line 29a) in the heat exchanger 50 will begin to close. This will not only deliver more mass flow to the combustor 15 (and ultimately to the turbine 10), but it will also increase the amount of thermal energy provided by the heat exchanger 50 to the combustor 15. Otherwise, when a power output of the turbine 15 is reduced, valve 6 and valve 7 can be opened as needed. This artificially increases the flow rate through the lower half of the heat exchanger 50 (e.g., through heat exchange section 50b) and quenches the turbine exhaust temperature to further help manage the heat exchanger temperature profile.

The control function therefore can comprise causing one or both of a portion of the recycle stream and a portion of the oxidant stream to be passed to the exhaust stream responsive to one or both of the following inputs: a signal indicating a change in power demand effective to cause an operational change of a turbine altering power generation from the power production plant (see signal 101b in FIG. 1); and a signal indicating that a temperature within the HEU is within a defined threshold of a maximum operating temperature of the HEU (see signal 101a in FIG. 1). Output signals 102c and 102d may thus be generated for controlling fluid passage through valve 6 and valve 7, respectively. Although signals 101a and 101b are shown as example embodiments, it is understood that similar signals may be received from a variety of components of the present systems. For example, input signals may be received by the controller from any of the pump 20, the pump 40, the compressor 30, the compressor 31, an IGV 32, the separator 35, the compressor 14, and any of the lines described herein. As such, signals may relate information directed to a pressure at a certain point in the system, a flow rate at a certain point in the system, a temperature at a certain point in the system, a molar concentration of a compound at a certain point in the system, or any similar parameter that may be useful for implementing a control function as otherwise described herein. For example, suitable input signals may include any one or more of the following: a power demand signal; a gasifier output signal (e.g., indicating that the syngas flow exceeds a defined threshold amount); a hydrogen demand signal (e.g., indicating that the hydrogen flow exceeds a defined threshold amount); a syngas chemistry signal from the gasifier (e.g., which can be indicative that the estimated or actual mole fraction of one or more components of the produced syngas exceeds a defined threshold); a signal defining a syngas chemistry for the syngas stream being sent to the power cycle (the mixed stream from the bypass and the reduced hydrogen syngas stream); a feedstock modification signal; an ASU operation signal; a nitrogen availability signal; a mixed fuel Wobbe index signal; and the like. Likewise, output signals may be directed for control of any one or more of the above-exemplified components of the system in order to implement a control function as otherwise described herein.

In embodiments wherein it may be desirable to operate the turbine 10 so as to have a maximum output (e.g., operating at full load), then the heat exchanger bypass line 1 may be used to limit the rate of temperature change in the heat exchanger 50 in conjunction with the maximum flow rates of pump 20 and/or pump 40 being provided near instantaneously through the heat exchanger 50 with minimal use of the recirculation lines (29a, 39a).

Figure 3:
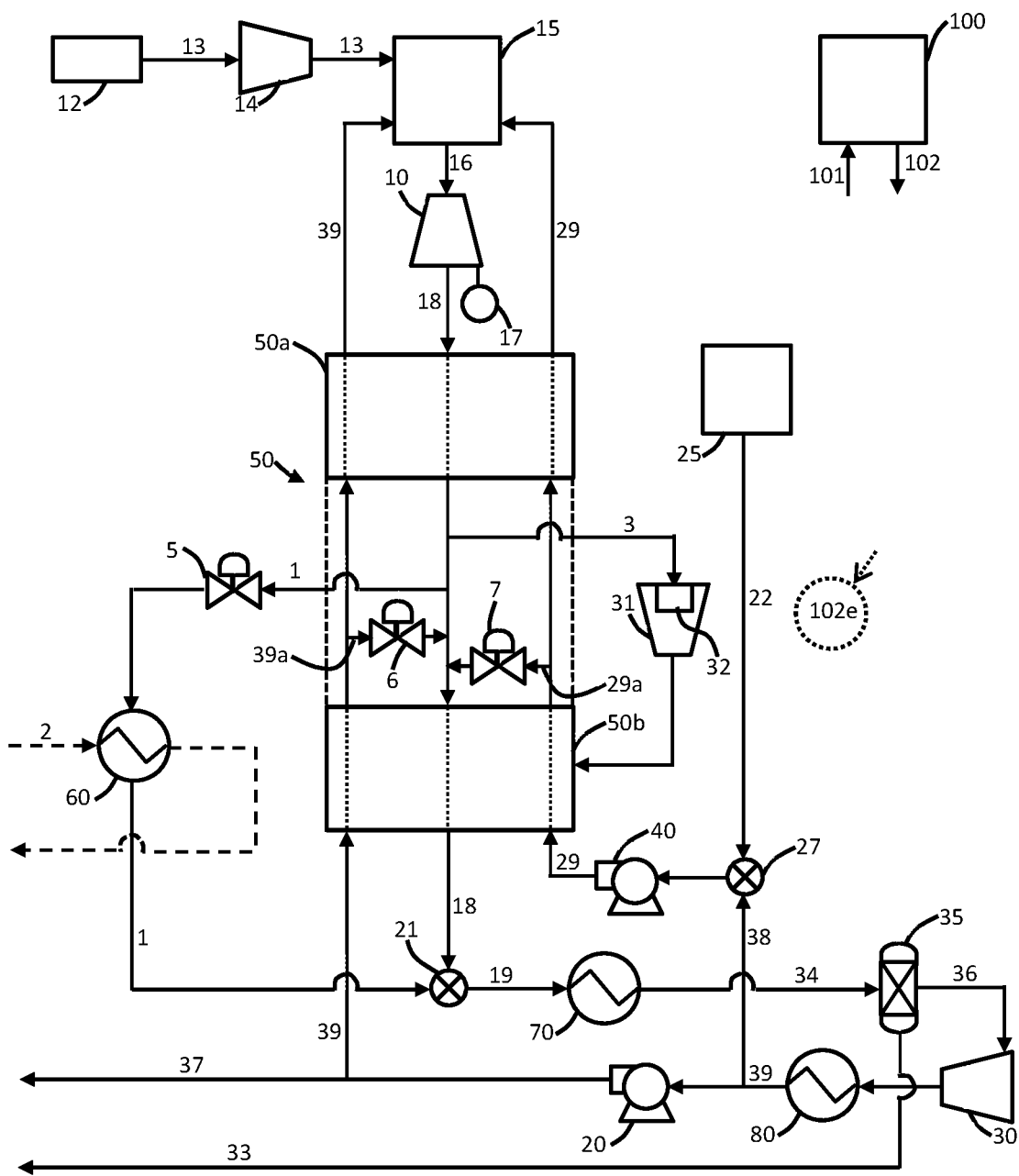
FIG. 3 is a diagram of a power production system and method according to a further example embodiment of the present disclosure.

In one or more embodiments, a power cycle according to the present disclosure can be operated to utilize one or more recompression systems, and such systems likewise can be controlled so as to manage the flow through the recompression cycle to achieve intermediate temperature management in the heat exchanger 50. Recompression systems not only pressurize the recycle fluid but also provide low-grade heat to the power cycle's main recuperative heat exchanger (e.g., heat exchanger 50) as a means of recycle temperature optimization. FIG. 3 depicts a directly fired sCO2 cycle with a recompression system originating from within the heat exchanger 50. The recirculation compressor 31 thus can be configured for withdrawing a portion of a heated turbine exhaust stream passing through the HEU 50, compressing the portion of the heated turbine exhaust stream that is withdrawn, and recombining the portion of the heater turbine exhaust stream that is compressed at a downstream section of the HEU. As illustrated, the portion of the turbine exhaust stream is withdrawn between HEU section 50a and HEU section 50b and is recombined in HEU section 50b.

As described above, a reduction in power demand from such a system will generate a higher average heat exchanger temperature. This impacts compressor 31 in recompression line 3 by increasing its suction temperature (and thereby also its outlet temperature) as a constant outlet pressure is maintained. Energy consumption of compressor 31 will also be expected to increase in such embodiments. In some embodiments, this trend may be effectively reversed by actively reducing the flow rate through compressor 31 while maintaining a substantially constant outlet temperature for the exhaust stream in line 3. A controller for compressor 31 can actively monitor one or more check points on line 3 to ensure that the stream in line 3 does not exceed an optimized desired temperature by providing feedback to location of the inlet guide vane (IGV) 32 of the compressor 31. In this fashion, the control function can comprise closing an inlet guide vane (IGV) 32 of the recirculation compressor 31 responsive to a signal indicating that a temperature within the HEU is within a defined threshold of a maximum operating temperature of the HEU (see, for example, signal 101a in FIG. 1). Such output signal is shown in FIG. 3 as signal 102e.

Under traditional control, the IGVs are used to limit power consumption while maintaining a safe margin to surge. IGVs may be used to control discharge pressure through various controllers. However, in certain situations, the IGVs may be placed into manual control and forced open in order to increase the flow in the recycle lines. In such a case, the inventory of the system will increase. This may be done in order to pre-empt a change in load or turning on the downstream pump. In more specific relation to temperature optimization as presently disclosed, as the optimized temperature is approached, the IGVs of the compressor 31 can be closed in order to decrease exhaust flow through the unit. The reduction in flow and subsequent low-grade heat addition to the heat exchanger 50 can create a cascading effect where average heat exchanger temperature will reduce. Eventually the feedback of reducing flow and reducing suction temperature at the compressor 31 will converge upon a mode of operation where the requirement at the check point is satisfied. This will also lead to the lowest energy consumption at compressor 31 required to maximize the recycle temperature level that may be obtained with the heat exchanger 50. When the IGVs of compressor 31 close, the IGVs of compressor 30 may need to open to allow it to pressurize an increased amount of flow. Alternatively, should heat recuperation occur at heat exchanger 60, then the suction temperature of compressor 31 may fall and so may the temperature check point on line 3. This would actually force the IGVs of compressor 31 to open to generate more heat. Opposing, the IGVs of compressor 30 would need to close to account for increased flow at compressor 31. In all scenarios, IGVs may be substituted with recirculation lines and coolers.

Figure 4:
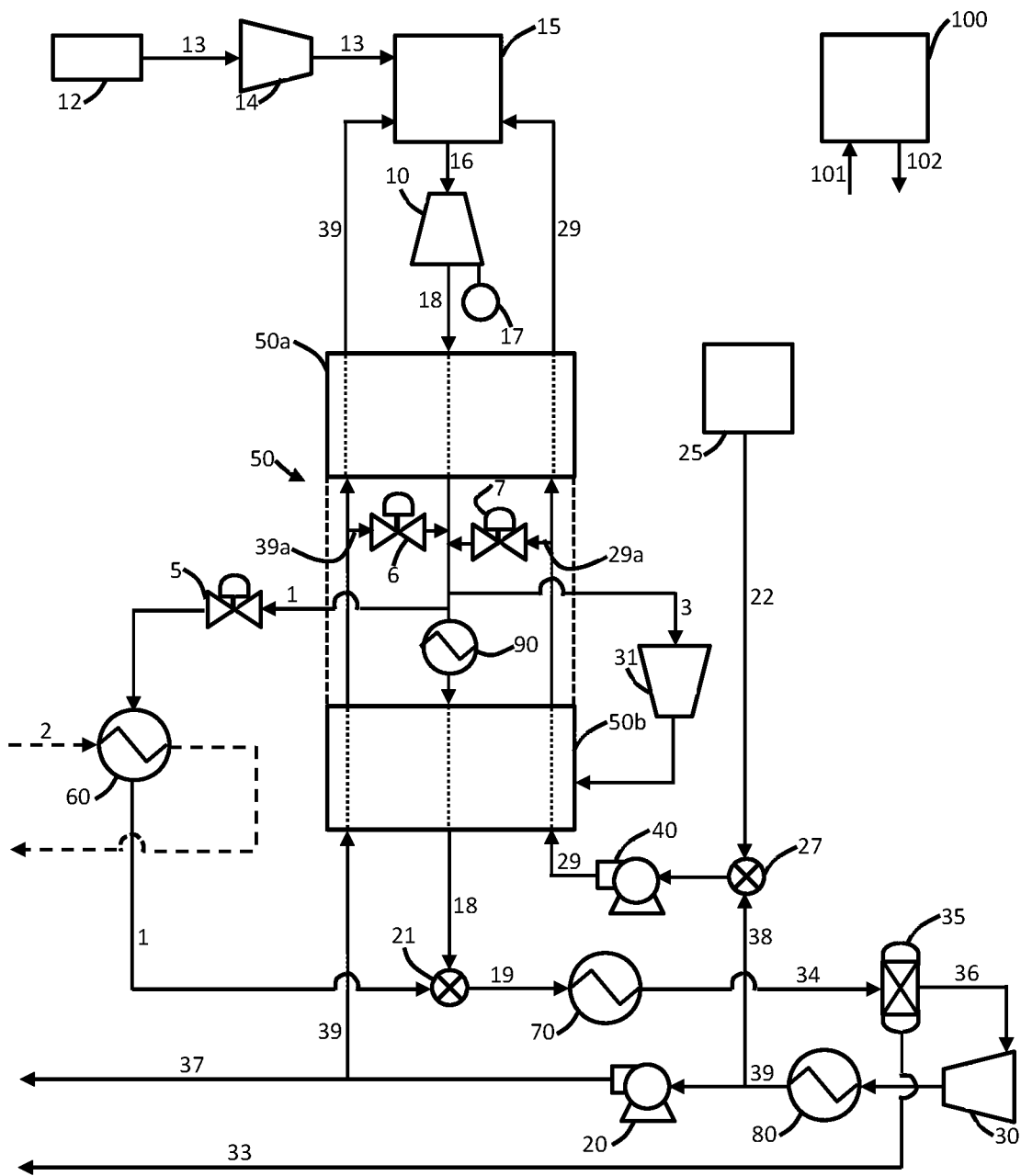
FIG. 4 is a diagram of a power production system and method according to an additional example embodiment of the present disclosure.

In further embodiments, another manner of providing heat to the heat exchanger network 50 can be carried out as illustrated in FIG. 4. In particular, a further heat source (heater 90) can be provided at an intermediate temperature in the heat exchanger 50. The heater 90 may operate by providing heat directly or indirectly. The source of heat can also vary such as it may come from electricity, solar, nuclear, or fuel combustion resources. The heater 90 may also be located on any of the streams within the heat exchanger network 50. In one embodiment, heater 90 is an oxy-fired duct burner on the exhaust flow of turbine 10. Combusted fuel emissions freely mix with the turbine exhaust flow and contribute to a temperature rise. This addition of thermal energy may serve several purposes. For example, as illustrated, heater 90 is located downstream of the bypass line 1, the recirculation lines 29a and 39a, and the recompression line 3, which are all described above. In this situation, the plant may be essentially preheated while the balance of the cycle around turbine 10 operates in a substantially closed-loop manner. The bypass lines associated with valve 6 and/or valve 7 may divert part or all of their source flows. The design flow rates can be configured to accommodate over-speed protection of the turbine 10 in the event of a trip scenario. In further embodiments, the heater 90 may be used to provide additional thermal energy for heat exchanger 60 to the extent that the temperature profile of the heat exchanger network 50 is minimally affected. In such embodiments, line 1 may be reconfigured to branch from the turbine exhaust flow line 18 downstream of the heater 90 within the heat exchanger network 50. In yet another embodiment, heat provided from the heater 90 can be used to stimulate the closure of the IGVs at compressor 31.

Without a power output change at turbine 10 or change in the heat exchanger profile of the heat exchanger 50, the net power out of the plant will be expected to increase due to pressurization of the recycle working fluid preferentially being diverted to compressor 30, which is typically configured to have relatively greater operational efficiency.

In addition to the turbine exhaust temperature impacting the profile of the heat exchanger 50, the temperatures of the streams entering the heat exchanger 50 through lines 29 and/or 39 likewise will affect the heat exchanger profile since it serves as the low temperature energy sink. In embodiments wherein the heat exchanger 50 is being optimized for a full power output, there is an assumed temperature that the recycle fluid has as it leaves pump 20 and enters the heat exchanger 50. When the cycle experiences a reduction in power output, the temperature of the recycle fluid entering heat exchanger 50 will drop given the reduction in work required at pump 20 for a lower pressure. This has the impact of decreasing the average heat exchanger temperature. While such an effect may not promote exceeding the design limits of the intermediate temperature check points of heat exchanger 50, it does increase thermal cycling as turbine power output is varied. This phenomenon can be abated by increasing the work done at pump 20 in order to maintain near constant outlet temperature. A temperature check point on the recycle $CO_2$ stream in line 39 at the outlet of pump 20 can be used to provide feedback to a controller working in association with pump 20. The controller can be used to bias the set point pressure at the outlet of compressor 30. If load demand at the turbine is to decrease or the cooling temperature at heat exchanger 80 is to decrease, then the set point pressure at compressor 30 would reduce as well (with the inverse operations likewise occurring). While it is desirable to maintain near constant outlet temperature at pump 20, this may not be feasible in all scenarios. The suction pressure of pump 20 preferably is not permitted to drop below a temperature-pressure correlation curve related to the working fluid. The curve depicts coincident temperatures and pressures required at heat exchanger 80 that result in a single phase working fluid that meets a minimum specific gravity compatible for use in pump 20. Should a further reduction in compressor 30 outlet pressure not be feasible, then the cooling duty at heat exchanger 80 can be reduced until the desired set point temperature at the outlet of pump 20 is achieved. The variation in cooling duty can promote an iterative balancing of cooling duty and compressor 30 outlet pressure until the minimum requirements of the temperature-pressure correlation curve are met. It should be noted that the aforementioned scheme is compatible with any number of compressors and pumps in series. Moreover, changes in cooling water temperature can provide a comparable effect as load changes and can be treated in a similar manner.

In addition to the temperature control schemes above, the temperature of the heat exchanger 50 may also be adjusted when pump 20 and/or pump 40 are off. This can be achieved, for example, through the modulation of cooling water through cooler 80 and/or cooler 70 or intercoolers within compressor 30 (e.g., when compressor 80 is configured as a multi-stage compressor with intercooling). It may be desirable to provide excess low grade heat into the cold end of heat exchanger 50 in order to provide the same temperature regulation as described above. Furthermore, the temperature regulation of said heat exchangers can also be used to influence the inlet temperatures of the downstream pump 20 and/or pump 40 to the extent that the work they provide generates discharge conditions capable of also providing main recuperative heat exchanger work. This can be done as an alternative to reducing inlet pressure which feasibly can generate comparable conditions. The inlet pressure of the various pumps may be maintained at a constant pressure, meanwhile the temperature can be adjusted to provide the appropriate outlet temperature needed to balance the heat exchangers given the corresponding outlet pressure.

The various temperature control schemes described herein can be used independently or in any combination with one or more of the further control schemes described herein. Should multiple temperature control schemes be used simultaneously, their activities can be prioritized in a manner as described herein. In particular, it can be preferred that the flow rate through the turbine exhaust bypass through line 1 is minimized in all levels of turbine power output. This is because the thermal energy contained in the flow moving through the bypass line 1 can be derived from the heat source driving the power cycle. Preserving a maximum amount of heat transfer between the turbine exhaust and recycle fluid facilitates the highest power cycle efficiency. Alternatively, the use of heater 90 can negate this effect and allow heat recovery at heat exchanger 60 to merely share balance of plant resources with the power cycle. Thereafter, the outlet temperature of pump 20 can be controlled to its optimal value. Lastly, the flow rate through the recompression system (e.g., line 3 and compressor 31) can be minimized or maximized to the extent that the temperature at check point on line 3 approaches its optimal desired value.

Figure 5:
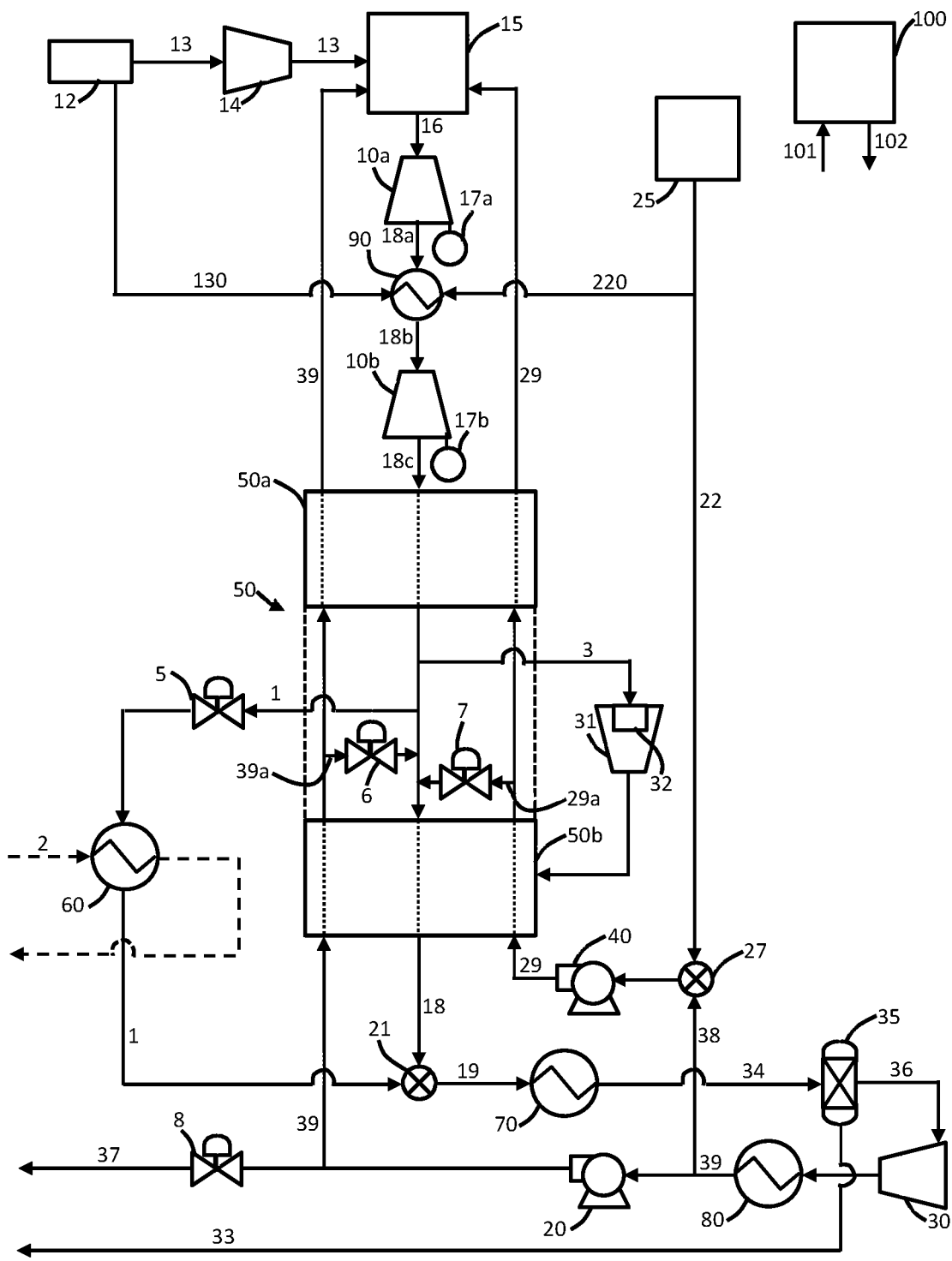
FIG. 5 is a diagram of a power production system and method according to yet another example embodiment of the present disclosure.

In further embodiments, heat management may be provided via one or more control functions related to the power cycle turbine arrangement. As can be seen in FIG. 5, multiple turbines or turbine sections operating in series may be configured to have one or more intervening heat sources in addition to the primary combustor 15. In FIG. 5, two turbines 10*a* and 10*b* are illustrated with one intervening heat source 90, but two or more, three or more, or even further turbines or turbine sections may be used along with one or more, two or more, ore even more intervening heat sources. Specifically, as illustrated, the combustor exhaust in line 16 passes to the first turbine 10*a* to power generator 17*a* and provide a first turbine exhaust in line 18*a*, which is passed through intervening heater 90. The heated stream leaving the intervening heater 90 in line 18*b* passes to the second turbine (or last turbine) 10*b* to power generator 17*b* and provide a second turbine (or last turbine) exhaust in line 18*c*, which passes on to the heat exchanger 50, as otherwise described herein.

The heat provided in intervening heater 90 may be derived from any source (e.g., steam, solar, combustion). In certain embodiments, as shown in FIG. 5, the heater 90 may be a combustion heater. Thus, fuel from fuel source 12 may be provided to the heater 90 through line 130, and oxidant from the oxidant source 25 may be provided to the heater 90 through line 220.

As with the primary control logic described herein, flow control at the pump 20 can be used to control the inlet temperature to the heat exchanger 50 during substantially steady-state and transient conditions. Changes in load output at the turbine array (e.g., leaving any turbine present in the array or, more specifically, leaving the last turbine in the array) may be achieved by diverting more or less flow from the combustor 10 to the intervening heater 90. The valve 8 present in line 37 can be used to maintain a constant outlet pressure from the turbine 10*b*, and movement of fuel between the combustor 15 and the intervening heater 90 can change the resulting inlet temperatures of the respective units and therefore also change the pressures of the streams entering turbine 10a and turbine 10b. Subsequently the relative work done respectively by turbine 10a and turbine 10b can also change for a given system fuel input. The exact conditions of operation for turbine 10a and turbine 10b can have a material impact on the efficiency of the units. In such a system configuration, a fixed fuel flow may lead to various permutations of net power output due to the changing of the expanders' operational characteristics given their inherent performance curves. Associated with this effect will also be that the overall system flowrate provided by pump 20 may be varied in accordance with maintaining a constant temperature into the heat exchanger 50. While fuel flow to the power cycle may be held constant, when a reduction in power output is desired, the exhaust flow rate through heat exchanger 50 may be artificially manipulated in order to continue heat scavenging at heater 60.

As is evident from FIG. 1 through FIG. 5, the present disclosure can relate not only to methods for controlling power production plants but also to configurations of power plants themselves. A power production plant may include any combination of the components described in relation to the noted figures or as otherwise described herein. For example, a power production plant can comprise at least a turbine 10, a power generator 17, a heat exchange unit (HEU) 50, one or more compressors 30 or pumps 20, and a control unit 100. In addition, the HEU 50 particularly can be configured for heat exchange between a plurality of streams passing between a first HEU end 50' having a first operational temperature and a second HEU end 50" having a second, lower operational temperature. The streams can include, for example, a turbine exhaust stream 18, a recycle stream 39 (which can comprise substantially pure carbon dioxide), and an oxidant stream 29 (which can comprise substantially pure oxygen, can comprise air, or can comprise a mixture of oxygen and carbon dioxide).

In addition, the HEU can include one or more components configured to add mass flow to or withdraw mass flow from one or more of the plurality of streams at a point that is positioned between the first HEU end 50' and the second HEU end 50" such that a portion of a fluid passing through the one or more of the plurality of streams is diverted from passage through a remaining section of the HEU. For example, referencing FIG. 1, a portion of the turbine exhaust stream 18 is diverted through bypass line 1 and thus is diverted from passage through HEU section 50b. Further to the above, the control unit can be configured to receive a signal 101 defining an operating condition of the power production plant and, based thereon, output a signal 102 effective to control the one or more components configured to add flow to or withdraw flow from (e.g., mass flow or volume flow) one or more of the plurality of streams. In some embodiments, the HEU 50 can be configured for heat exchange between at least a turbine exhaust stream exiting a turbine and one or both of a recycle stream and an oxidant stream. Further, the one or more components configured to add flow to or withdraw flow from one or more of the plurality of streams can include a bypass line 1 and a bypass valve 5 configured to divert a portion of the turbine exhaust stream around a section of the HEU. In such configurations, the plant can also include a bypass heat exchanger 60 operational with the bypass line 1 and configured to transfer heat from the portion of the turbine exhaust stream diverted therethrough to one or more further streams 2.

In some embodiments, the one or more components configured to add flow to or withdraw flow from one or more of the plurality of streams can include a recirculation line 39a and a recirculation valve 6 interposed between the turbine exhaust stream 18 and the recycle stream 39. Similarly, the one or more components configured to add flow to or withdraw flow from one or more of the plurality of streams can include a recirculation line 29a and a recirculation valve 7 interposed between the turbine exhaust stream 18 and the oxidant stream 29.

In further embodiments, the power production plant can include a heater 90 that is configured for operation independent of the HEU 50. Such independent operation can mean simply that the heat provided by the heater 90 is from a source other than any heated stream that is used to provide heat exchange in the HEU 50. For example, the heater 90 can be configured for addition of heat to the turbine exhaust stream 18 at a point that is positioned between the first HEU end 50' and the second HEU end 50". As noted already above, the heater 90, for example, can be a combustion heater. Further configurations and components can be identified based upon the further components that are illustrated in relation to FIG. 1 through FIG. 5 as already discussed above.

In some embodiments, a power cycle control as described herein by be combined with a liquefied natural gas (LNG) regasification terminal. See for example, U.S. Pat. No. 9,523,312 to Allam et al., the disclosure of which is incorporated herein by reference. In such embodiments, a fuel flow rate and its associated blower for temperature modulation may be modulated to adjust for regasification demand in addition to power demand.

In some embodiments, the present systems and methods may be adapted to or configured to adjust for happenings wherein a turbine may leak through its seals. In such a case, a compressor may be added in order to recompress the seal leakage and place it back into the cycle between the stream and compressor. In such cases, the same compressor may also be used for startup to fill the system from an external tank or pipeline. In such a case, the compressor discharge may be controlled with a controller to regulate the low pressure of the system. The suction of the compressor may be controlled to cause either positive or negative pressure at the turbine gland seals. The change from positive to negative pressure may change throughout operation in order to adjust the chemistry from atmospheric contamination.

During steady-state operation of a combustion cycle such as noted above, combustion derived products must be continuously removed from the cycle (e.g., removal of $CO_2$ through line 37 and/or water removal through line 33) in order to maintain a mass balance with the incoming fuel and oxidant. The resulting $H_2O$ and $CO_2$ must be drained and/or vented; however, if the vapor phase $CO_2$ is to be used in a downstream process, it may be discharged at a pressure up to that of the turbine inlet pressure. First it needs to undergo a de-watering step. Any residual SOx/NOx can be removed in situ (e.g., in separator 35). The $CO_2$ can then be compressed and/or pumped to the desired pressure using the working fluid turbo-machinery present in the power production cycle. Additionally, the $CO_2$ stream may be subjected to a cleanup process whereby minor contaminants such as $O_2$ and Ar are further removed. At this point the stream can be exported for the downstream use.

If it is necessary for the $CO_2$ to be at an elevated temperature prior to use in the downstream process, it may be desirable to heat it against the main recuperative heat exchanger train in the power production cycle countercurrently to the turbine exhaust flow path. As the export flow is heated up against the heat exchanger array, the recycle $CO_2$ entering the turbine will drop in temperature. In order to prevent this change, the flow rate through the hot gas compressor can be increased by opening the inlet guide vanes ("IGVs") on the unit. This will serve the purpose of providing an increase in low-grade heat to the heat exchanger train. It will also reduce the total flow rate of $CO_2$ through the main $CO_2$ compressor. This will force the IGVs on this unit to close in order to accommodate the new conditions. The total gross power output at the turbine will not change given that the inlet conditions will remain the same as beforehand. There also won't be a change in fuel input to the facility given that the recycle $CO_2$ temperature has been maintained. Rather, the net power output of the plant will reduce given that the hot gas compressor operates less efficiently as a pressurization device than the main $CO_2$ compressor. The basic effect is that fuel has been converted to electricity to then be exported as thermal energy in the discharged $CO_2$ stream. All combustion and pressurization activities are inherently managed by the equipment and controls capabilities of the power cycle. The quality and quantity of heat to the downstream process may be varied by the amount of export $CO_2$ heated by the recuperative heat exchanger train as well as the total flow rate of $CO_2$ processed by the hot gas compressor.

In some embodiments, the presently disclosed systems and methods allow the hot gas compressor in the power production cycle to provide low grade heat for the optimization of the recuperative heat exchanger while also serving as a heat source for external industrial processes utilizing the cycle's export $CO_2$ as a feedstock and/or heat transfer fluid. The hot gas compressor is managed in such a way that the inlet conditions to the turbine (and therefore gross performance) do not change while heat is being provided to a downstream industrial process. Therefore, thermal cycling of the turbine does not occur. The net power output of the power production cycle, however, is reduced given that the heat generated for the external industrial process increases the parasitic load of the hot gas compressor (i.e., effectively converting electricity back into thermal energy). This has the impact of varying the $CO_2$ generated per MWhr produced for the power production cycle (allows for flexibility in addressing disparities in $CO_2$ demand versus power demand). The benefit to a downstream industrial process is that the need for dedicated heat generation (e.g., natural gas burners, etc.) and heat recovery equipment (steam boilers, tube and shell exchangers, feed water pumps, etc.) is eliminated. As well, the downstream process is able to operate without an emissions profile since the generation of thermal energy via combustion has occurred at the turbine of the power production cycle. In addition, different from other chemical processes, $CO_2$ generated in power production cycle is purified by its combustion and downstream DeS-NOx processes without any additional equipment and solvents. Any residual gaseous fuel, such as $CH_4$, $CO$, $H_2C_2H_6$, is removed from $CO_2$ by combustion, and any steam, NOx, and/or SOx are removed at a downstream direct contact cooler The control functions available according to the present disclosure can enable the currently described power production systems and methods to be utilized for producing a variety of end products in addition to energy. The $CO_2$ generation, compression, and heating processes can be completely contained within the power production cycle, and it is thus possible to take advantage of equipment that is already necessary for the power cycle even if the downstream industrial process did not exist. The combustion of natural gas for thermal input into downstream process may take advantage of off peak power pricing. This may enable the power production cycle to function as a tri-generation plant providing power, $CO_2$, and heat.

In some embodiments, urea synthesis may be particularly combined with the power cycle, and this can require an ammonia source. The necessary ammonia ($NH_3$) can be either a co-product of the underlying power production cycle, or it can be bought as a commodity (e.g., from outside ammonia plants). In embodiments wherein $NH_3$ is purchased as a commodity, a power production cycle according to the present disclosure exporting $CO_2$ for urea synthesis can be carried out to provide a method for co-production of power and urea. Specifically, $CO_2$ can be formed in the combustion process as otherwise described herein (e.g., taken as a product from line 37, taken at an increased temperature from some point in line 39, or taken at a lower pressure upstream from the pump 20). Beneficially, high grade heat of combustion can be recuperated from the combustor exhaust or a turbine exhaust stream (e.g., at a point from the heat exchanger 50) by counter-current heating of cold, recycle $CO_2$ to the required combustion inlet temperature. This can be specifically the pressurized stream exiting the pump 20. The IGV 32 of the compressor (e.g., compressor 31) can be opened to increase the $CO_2$ flow rate at the inlet of the compressor, thus increasing the low grade heat (e.g., at approximately a temperature of 150 to 300° C.) generated from the compressor for the downstream Urea synthesis process. The flow rate of $CO_2$ at the compressor inlet can be dictated by the amount of extra low grade heat required for downstream Urea synthesis. Meanwhile, the IGV of the main compressor 30 can be closed to adjust $CO_2$ entering it correspondingly. Total $CO_2$ at the primary heat exchanger 50 outlet can be sent to the separator 35 for liquid water removal, and SOx/NOx (if any) removal. $CO_2$ can be compressed and pumped to the required pressure (e.g., in compressor 30 and pump 20), and a portion of the $CO_2$ can be separated from the main $CO_2$ stream at a pressure of about 140-175 bar. The separated $CO_2$ can be directed into the primary heat exchanger 50 to be heated to about 190° C., then this portion of $CO_2$ at about 140-175 bar and about 190° C. can be sent to the downstream Urea production unit. The final temperature, pressure, and flow rate of this portion of the $CO_2$ can be dictated by the Urea synthesis process. Low grade heat that may be needed can be generated from the compressor 31 or similar unit. Any remaining, required $CO_2$ can be pumped to combustion inlet pressure, heated to combustion inlet temperature against the turbine exhaust stream in the primary heat exchanger 50, and directed into the combustor 15. The primary heat exchanger profile is maintained by this approach.

Figure 6:
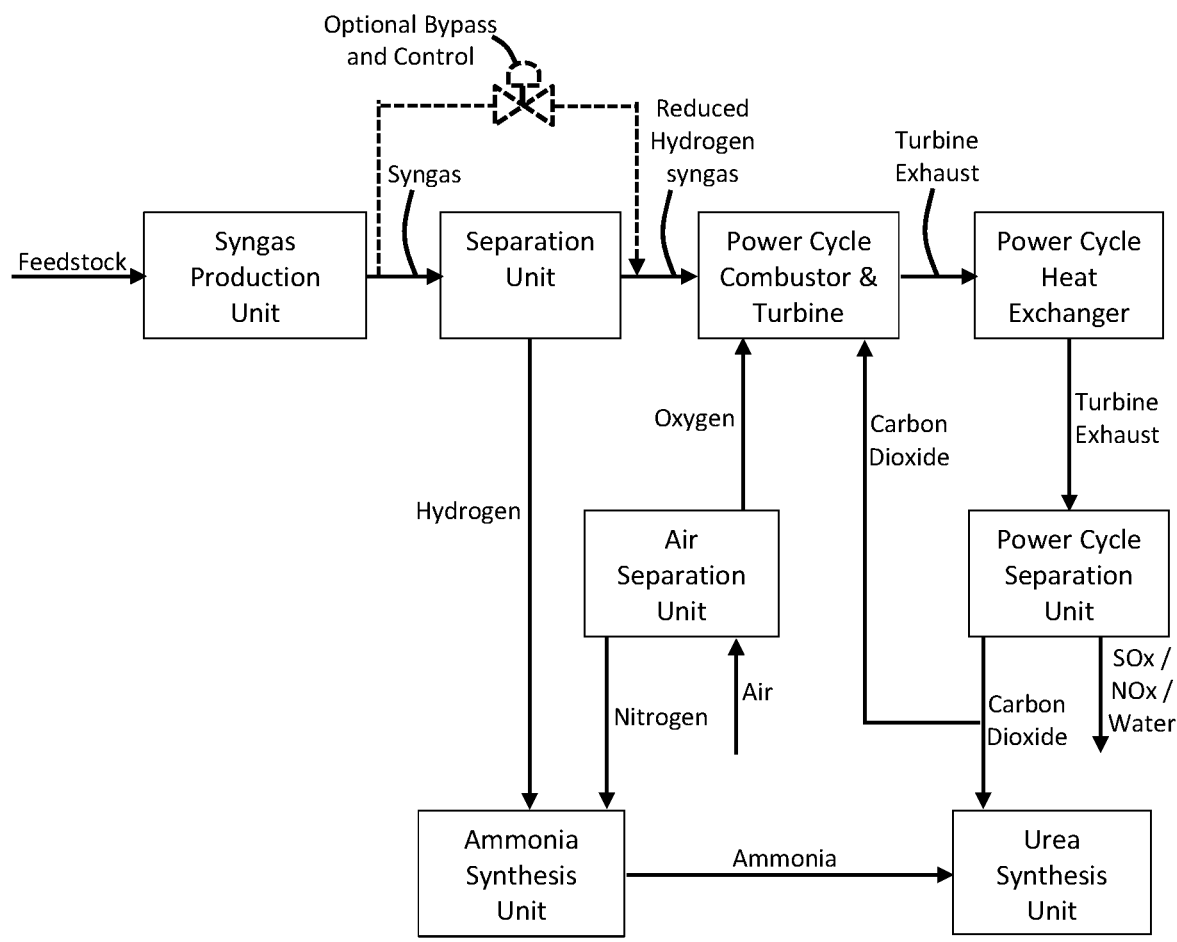
FIG. 6 is a flowchart showing a process whereby power can be produced in connection with formation of one or more products suitable for export according to example embodiments of the present disclosure.

In further embodiments, a power production cycle according to the present disclosure exporting $CO_2$ for urea synthesis can be carried out utilizing ammonia that is co-generated in the power production cycle. In such embodiments, a suitable feedstock can be processed in a suitable syngas production unit (e.g., via being sent to a gasifier or a steam methane reforming ("SMR") unit to create raw syngas. The raw syngas can be processed through a suitable separation unit (e.g., a membrane separation unit) wherein hydrogen can be separated from raw syngas for Ammonia synthesis. Hydrogen lean syngas can be sent to the combustor and turbine of the power production cycle for power generation as otherwise described herein, and the hydrogen (or a portion thereof) can be sent to an ammonia synthesis unit. Turbine exhaust ($CO_2$ stream) can be directed into the primary heat exchanger for high grade heat recuperation. A portion of the $CO_2$ can be directed into the compressor for low grade heat generation for Urea synthesis. The total $CO_2$ stream exiting the heat exchanger can then be directed to a DeSNOx unit for SOx/NOx removal. In this unit, which can be used as a replacement for, or in addition to, the separator 35, all the sulfur compounds in the feedstock are removed from the $CO_2$ stream. Therefore, an acid gas removal system or flue gas desulfurization system is eliminated for this poly-generation system. The $CO_2$ exiting the DeSNOx unit is at ambient temperature and about 30 bar, and it is free of liquid water and SOx/NOx. Nitrogen from an air separation unit (which can be an integral part of the power production cycle) and hydrogen from the membrane separator are sent to an ammonia synthesis unit. The operating condition of ammonia synthesis can be at a pressure of about 200-250 bar and a temperature of about 400 to 500° C. The heat source of the ammonia synthesis process can be derived from the turbine exhaust, hot gas compression, or other heat source in the system. Ammonia produced from the ammonia synthesis unit can be sold as a chemical product, or can be sent to a Urea synthesis unit along with clean $CO_2$ from DeSNOx process for producing Urea. Production of one or both of ammonia and urea can be as illustrated in FIG. 6.

In further embodiments, the power cycle as described herein can be combined with processes such as retorting of kerogen. Kerogen is currently retorted by collecting open mine material and placing it into a furnace. Processes according to the present disclosure can entirely avoid mining and can provide options for harvesting and use of deep reserves that are currently unusable. In an example embodiment, pressurized and heated (e.g., heating to a temperature of about 50-150° C. for oil production or to a temperature of about 150-200° C. for gas production) $CO_2$ can be injected into a kerogen reserve below grade containing bitumen. The heated $CO_2$ migrates through the sedimentary rock structure forming the bitumen resulting in the formation of lighter hydrocarbons either in the form of oil and/or gas. The pressure of the $CO_2$ forces the lighter hydrocarbons to the surface for collection.

In yet further embodiments, the power cycle can be utilized in relation to carbon capture, utilization, and storage in a saline aquifer. For example, pressurized $CO_2$ (e.g., from line 37) can be delivered to a saline storage site at the required reservoir pressure. Prior to being injected below grade, the stream can be preheated to a temperature above the reservoir's water dew point through the systems and methods described herein utilizing a power production cycle. Upon contacting the saline aquifer, a portion of the liquid content is vaporized. A mixture of steam (desalinated water) and a portion of the injected $CO_2$ flow through an adjacent relief well allowing for the harvest of water and reuse of $CO_2$ at the surface. In addition to performing desalination, the reservoir has been depressurized allowing for further $CO_2$ storage.

In some embodiments as described herein, a stream of $CO_2$ can be treated for oxygen removal to improve the ability to utilize the $CO_2$ in hydrocarbon recovery. In example embodiments, the IGVs of one or more hot gas compressors can be opened such that an increase in flow is provided to heat a stream of $CO_2$ equivalent to the plant export flow up to a temperature of about 250° C. (which temperature can be greater in some embodiments depending upon the compressor design). The plant export flow can be provided at a desired pressure through the main heat exchanger 50 and heated against the compressor flow or can be directly derived from the compressor at its discharge. The heated $CO_2$ export stream then can be supplied to a mixer where methane, natural gas, or $H_2$ is introduced. The heated mixed stream then can be processed through a catalytic combustor where the heat energy catalyzes oxidation of the fuel content with the residual $O_2$ content in the $CO_2$. The resulting stream includes substantially no $O_2$ and contains and increased residual fuel content, $CO_2$ content, and/or $H_2O$ content. The stream then can be cooled and have all or part of the water content removed.

As can be seen from the foregoing, the present disclosure particularly can provide systems and methods for cogeneration of power and one or more end products. In an example embodiment, with reference specifically to FIG. 6, the system can comprise: a power production unit including at least a combustor, a turbine, a heat exchanger, and a separation unit, the power production unit being configured to receive a fuel stream and an oxidant and output power and substantially pure carbon dioxide; a syngas production unit configured to receive a feedstock and provide a syngas product, at least a portion of which is effective for use as at least a portion of the fuel stream in the power production unit; an air separation unit configured to provide oxygen for use as the oxidant in the power production unit and configured to provide nitrogen; and one or both of an ammonia synthesis unit and a urea synthesis unit.

In certain embodiments, the ammonia synthesis unit specifically can be present. In such cases, it can be desirable for the ammonia synthesis unit to be configured to receive nitrogen from the air separation unit, configured to receive hydrogen from a hydrogen source, and configured to output ammonia. In related embodiments, the hydrogen source can be a hydrogen separation unit configured to receive at least a portion of the syngas product from the syngas production unit and provide a stream of hydrogen and a stream of hydrogen-reduced syngas that is effective for use as at least a portion of the fuel stream in the power production unit.

In some embodiments, the urea synthesis unit specifically can be present. In such cases, it can be desirable for the urea synthesis unit to be configured to receive nitrogen from a nitrogen source, configured to receive carbon dioxide from the power production cycle, and configured to output a urea stream. In related embodiments, the nitrogen source specifically can be the ammonia synthesis unit.

As further seen in FIG. 6, the systems and methods can incorporate the use of an optional bypass and control which can allow a portion of the syngas to bypass the hydrogen separation and proceed directly to the power cycle. This allows for more freedom of operation and a partial de-coupling of the gasifier, the power cycle, and the hydrogen production. In one or more embodiments, the bypass line may be controlled based upon a variety of input signals that may be received by the controller (e.g., controller 100 in FIGS. 1-5). For example, suitable input signals may include any one or more of the following: a power demand signal; a gasifier output signal (e.g., indicating that the syngas flow exceeds a defined threshold amount); a hydrogen demand signal (e.g., indicating that the hydrogen flow exceeds a defined threshold amount); a syngas chemistry signal from the gasifier (e.g., which can be indicative that the estimated or actual mole fraction of one or more components of the produced syngas exceeds a defined threshold); a signal defining a syngas chemistry for the syngas stream being sent to the power cycle (the mixed stream from the bypass and the reduced hydrogen syngas stream); a feedstock modification signal; an ASU operation signal; a nitrogen availability signal; a mixed fuel Wobbe index signal; and the like. Based upon one or more these input signals, one or more of the operational units defined in FIG. 6 may be operationally adjusted to provide the desired end product and/or the desired power output. Likewise, such signals may be utilized to modify process efficiency for any one or more of the individual units (e.g., power production, syngas production, hydrogen production, ammonia production, air product production, and urea production). Likewise, such signals can be utilized to adjust a total economic output of the facility.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Use of the words "about" and "substantially" herein can indicate relative degrees such that a value that is "about" a certain value or "substantially" a certain value can specifically be the exact amount +/−5%, +/−4%, +/−3%, +/−2%, or +/−1%.

The invention claimed is:

1. A method for control of a power production plant, the method comprising:
    adjusting a heat profile of a heat exchange unit (HEU) operating with a plurality of streams passing between a first HEU end having a first operational temperature and a second HEU end having a second, lower operational temperature;
    wherein said adjusting comprises implementing a control function that alters a mass flow of one or more of the plurality of streams passing between the first HEU end and the second HEU end by adding mass flow to or withdrawing mass flow from the one or more of the plurality of streams at an intermediate temperature range within the HEU at a point that is positioned between the first HEU end and the second HEU end;
    wherein said adjusting comprises any one or more of the following:
    causing a portion of a heated stream passing through the HEU to bypass a section of the HEU through a bypass line such that said adjusting is effective to reduce the mass flow of the heated stream that passes through the section of the HEU that is bypassed;
    causing a portion of a recycle stream being heated in the HEU to be passed to an exhaust stream being cooled in the HEU such that said adjusting is effective to increase the mass flow of the exhaust stream passing through a section of the HEU;
    causing a portion of an oxidant stream being heated in the HEU to be passed to an exhaust stream being cooled in the HEU such that said adjusting is effective to increase the mass flow of the exhaust stream passing through a section of the HEU.

2. The method of claim 1, wherein the heated stream passing through the HEU is a heated turbine exhaust stream from a turbine, the heated turbine exhaust stream passing from the first HEU end to the second HEU end to provide a cooled turbine exhaust stream, and wherein the cooled turbine exhaust stream is further processed through one or more of a separator, a compressor, and a pump.

3. The method of claim 2, wherein the control function comprises causing the portion of the heated stream passing through the HEU to bypass the section of the HEU through the bypass line responsive to one or both of the following signals received by a controller:
    a signal indicating a change in power demand effective to cause an operational change of the turbine altering power generation from the power production plant;
    a signal indicating that a temperature within the HEU is within a defined threshold of a maximum operating temperature of the HEU.

4. The method of claim 3, wherein the control function comprises opening a valve positioned in the bypass line.

5. The method of claim 3, wherein the portion of the heated stream passing through the bypass line is rejoined with the cooled turbine exhaust stream downstream from the second HEU end and upstream from one or more of the separator, the compressor, and the pump.

6. The method of claim 1, further comprising causing the portion of the heated stream passing through bypass line to be processed through a bypass heat exchanger effective to transfer heat from the portion of the heated stream in the bypass line to one or more further streams.

7. The method of claim 1, wherein the control function comprises causing the respective portion of the recycle stream and the oxidant stream to be passed to the exhaust stream responsive to one or both of the following:
    a signal indicating a change in power demand effective to cause an operational change of a turbine altering power generation from the power production plant;
    a signal indicating that a temperature within the HEU is within a defined threshold of a maximum operating temperature of the HEU.

8. The method of claim 1, wherein the power production plant includes a recirculation compressor configured for withdrawing a portion of a heated turbine exhaust stream passing through the HEU, compressing the portion of the heated turbine exhaust stream that is withdrawn, and recombining the portion of the heater turbine exhaust stream that is compressed at a downstream section of the HEU.

9. The method of claim 8, wherein the control function comprises closing an inlet guide vane (IGV) of the recirculation compressor responsive to a signal indicating that a temperature within the HEU is within a defined threshold of a maximum operating temperature of the HEU.

10. The method of claim 1, further comprising adding heat to one or more of the plurality of streams passing between the first HEU end and the second HEU end, wherein the heat is added at an intermediate temperature range within the HEU at a point that is positioned between the first HEU end and the second HEU end, and wherein the heat is added using a heater that is operated independent of the HEU.

11. The method of claim 10, wherein the heater is a combustion heater.

12. The method of claim 11, wherein the heat is added to a turbine exhaust stream passing through the HEU, and wherein an exhaust stream from the combustion heater is added directly to the turbine exhaust stream.

13. A power production plant comprising:
    a turbine;
    a power generator;
    a heat exchange unit (HEU);
    one or more compressors or pumps; and
    a control unit;
    wherein the HEU is configured for heat exchange between a plurality of streams passing between a first HEU end having a first operational temperature and a second HEU end having a second, lower operational temperature;
    wherein the HEU includes one or more components configured to add mass flow to or withdraw mass flow from one or more of the plurality of streams at a point that is positioned between the first HEU end and the second HEU end such that a portion of a fluid passing through the one or more of the plurality of streams is diverted from passage through a remaining section of the HEU;

wherein the control unit is configured to receive a signal defining an operating condition of the power production plant and, based thereon, output a signal effective to control the one or more components configured to add mass flow to or withdraw mass flow from the one or more of the plurality of streams;

wherein the HEU is configured for heat exchange between at least a turbine exhaust stream exiting a turbine and one or both of a recycle stream and an oxidant stream; and wherein the one or more components configured to add mass flow to or withdraw mass flow from one or more of the plurality of streams includes any one or more of the following:
- a bypass line and a bypass valve configured to divert a portion of the turbine exhaust stream around a section of the HEU;
- a recirculation line and a recirculation valve interposed between the turbine exhaust stream and the recycle stream;
- a recirculation line and a recirculation valve interposed between the turbine exhaust stream and the oxidant stream.

14. The power production plant of claim 13, further comprising a bypass heat exchanger operational with the bypass line and configured to transfer heat from the portion of the turbine exhaust stream diverted therethrough to one or more further streams.

15. The power production plant of claim 13, further comprising a heater that is configured for operation independent of the HEU, the heater being configured for addition of heat to the turbine exhaust stream at a point that is positioned between the first HEU end and the second HEU end.

16. The power production plant of claim 15, wherein the heater is a combustion heater.

17. A system for cogeneration of power and one or more end products, the system comprising:
- a power production unit including at least a combustor, a turbine, a heat exchanger, and a separation unit, the power production unit being configured to receive a fuel stream and an oxidant and output power and substantially pure carbon dioxide;
- a syngas production unit configured to receive a feedstock and provide a syngas product, at least a portion of which is effective for use as at least a portion of the fuel stream in the power production unit;
- an air separation unit configured to provide oxygen for use as the oxidant in the power production unit and configured to provide nitrogen; and
- one or both of:
    - an ammonia synthesis unit that is configured to receive nitrogen from the air separation unit, configured to receive hydrogen from a hydrogen source, and configured to output ammonia and;
    - a urea synthesis unit that is configured to receive nitrogen from a nitrogen source, configured to receive carbon dioxide from the power production cycle, and configured to output a urea stream.

18. The system of claim 17, wherein the hydrogen source is a hydrogen separation unit configured to receive at least a portion of the syngas product from the syngas production unit and provide a stream of hydrogen and a stream of hydrogen-reduced syngas that is effective for use as at least a portion of the fuel stream in the power production unit.

19. The system of claim 17, wherein the nitrogen source is the ammonia synthesis unit.

20. A method for control of a power production plant, the method comprising:
- adjusting a heat profile of a heat exchange unit (HEU) operating with a plurality of streams passing between a first HEU end having a first operational temperature and a second HEU end having a second, lower operational temperature;
- wherein said adjusting comprises implementing a control function that alters a mass flow of one or more of the plurality of streams passing between the first HEU end and the second HEU end by adding mass flow to or withdrawing mass flow from the one or more of the plurality of streams at an intermediate temperature range within the HEU at a point that is positioned between the first HEU end and the second HEU end;
- wherein the power production plant includes a recirculation compressor configured for withdrawing a portion of a heated turbine exhaust stream passing through the HEU, compressing the portion of the heated turbine exhaust stream that is withdrawn, and recombining the portion of the heater turbine exhaust stream that is compressed at a downstream section of the HEU.

* * * * *